US012619681B2

(12) United States Patent
Taccari

(10) Patent No.: US 12,619,681 B2
(45) Date of Patent: May 5, 2026

(54) SYSTEMS AND METHODS FOR DOMAIN-AWARE CLASSIFICATION OF UNLABELED DATA

(71) Applicant: Verizon Patent and Licensing Inc., Basking Ridge, NJ (US)

(72) Inventor: Leonardo Taccari, Florence (IT)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 1180 days.

(21) Appl. No.: 17/497,121

(22) Filed: Oct. 8, 2021

(65) Prior Publication Data

US 2023/0116417 A1 Apr. 13, 2023

(51) Int. Cl.
| | |
|---|---|
| *G06F 18/2415* | (2023.01) |
| *G06F 18/21* | (2023.01) |
| *G06F 18/214* | (2023.01) |
| *G06N 3/08* | (2023.01) |
| *G06V 10/75* | (2022.01) |

(52) U.S. Cl.
CPC ........ *G06F 18/2163* (2023.01); *G06F 18/214* (2023.01); *G06F 18/2415* (2023.01); *G06N 3/08* (2013.01); *G06V 10/751* (2022.01)

(58) Field of Classification Search
None
See application file for complete search history.

(56) References Cited

U.S. PATENT DOCUMENTS

| | | | | |
|---|---|---|---|---|
| 2021/0065223 A1* | 3/2021 | Blecha-Ward | ..... | G06Q 30/0203 |
| 2022/0188577 A1* | 6/2022 | Chopde | ................. | G06V 10/82 |

OTHER PUBLICATIONS

Freitas, Alex A. "Comprehensible classification models: a position paper." ACM SIGKDD explorations newsletter 15, No. 1 (2014): 1 -10. (Year: 2014).*
James G, Witten D, Hastie T, Tibshirani R. An introduction to statistical learning. New York: springer; Jun. 2013, corrected 8th printing 2017. 441 pages. (Year: 2013).*
Haixiang, Guo, Li Yijing, Jennifer Shang, Gu Mingyun, Huang Yuanyue, and Gong Bing. "Learning from class-imbalanced data: Review of methods and applications." Expert systems with applications 73 (2017): 220-239. (Year: 2017).*
Silla Jr, Carlos N., and Alex A. Freitas. "A survey of hierarchical classification across different application domains." Data mining and knowledge discovery 22, No. 1 (2011): 31-72. (Year: 2011).*

* cited by examiner

*Primary Examiner* — Vincent Gonzales

(57) ABSTRACT

Disclosed is a domain-aware semi-supervised machine learning ("DSSL") system. The system may determine that each data item of a set of data is associated with a particular domain, may identify a model that associates a set of parameters to a particular classification, and may compare parameters of each data item to the set of parameters included in the model. Based on the comparison, the system may determine that a first subset of the data items is associated with the particular classification, and that a second subset of the data items is not associated with the particular classification. The system may identify parameters of the second subset of data items that are different from the set of parameters in the model, and may perform a set of actions that are associated with the particular classification based on the second subset of data items being associated with the particular classification.

20 Claims, 11 Drawing Sheets

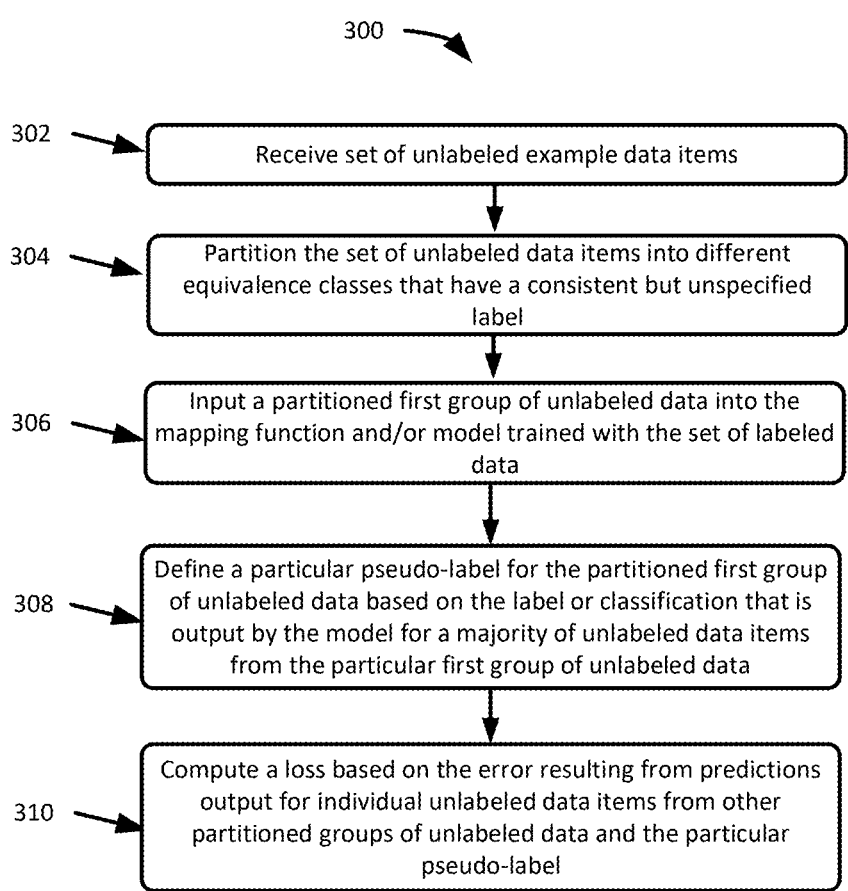

300

302 → Receive set of unlabeled example data items

304 → Partition the set of unlabeled data items into different equivalence classes that have a consistent but unspecified label 306 → Input a partitioned first group of unlabeled data into the mapping function and/or model trained with the set of labeled data 308 → Define a particular pseudo-label for the partitioned first group of unlabeled data based on the label or classification that is output by the model for a majority of unlabeled data items from the particular first group of unlabeled data 310 → Compute a loss based on the error resulting from predictions output for individual unlabeled data items from other partitioned groups of unlabeled data and the particular pseudo-label

FIG. 3

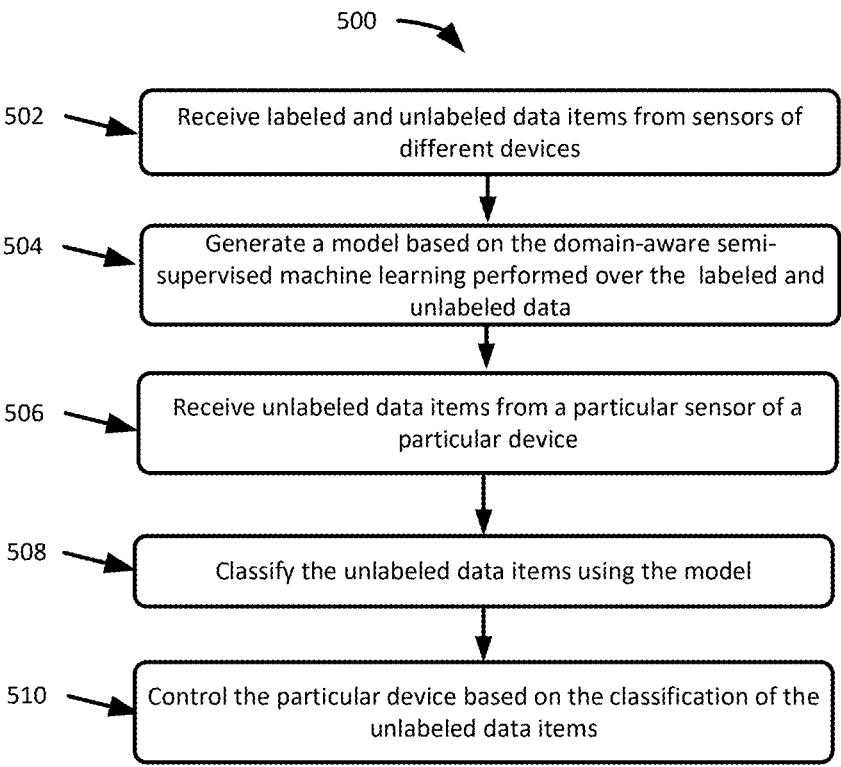

502 Receive labeled and unlabeled data items from sensors of different devices

504 Generate a model based on the domain-aware semi-supervised machine learning performed over the labeled and unlabeled data 506 Receive unlabeled data items from a particular sensor of a particular device 508 Classify the unlabeled data items using the model 510 Control the particular device based on the classification of the unlabeled data items

FIG. 5

SYSTEMS AND METHODS FOR DOMAIN-AWARE CLASSIFICATION OF UNLABELED DATA

BACKGROUND

Supervised machine learning may involve training a model based on a labeled set of example data, and using the model to identify and/or predict labels for unlabeled data that is provided as model input. The predictive accuracy (e.g., the error rate) of the supervised machine learning may be highly dependent on the number of examples and the variety in the examples used to train the model. However, collecting such a large and varied labeled data set may be too costly, time-consuming, and/or infeasible for many practical applications.

BRIEF DESCRIPTION OF THE DRAWINGS

FIG. 3 presents a process for performing the unsupervised machine learning portion of the DSSL in accordance with some embodiments presented herein;

FIG. 5 presents a process for controlling a system or device based on actions determined from the DSSL classifications in accordance with some embodiments presented herein;

DETAILED DESCRIPTION OF EXAMPLE EMBODIMENTS

Figure 1A:
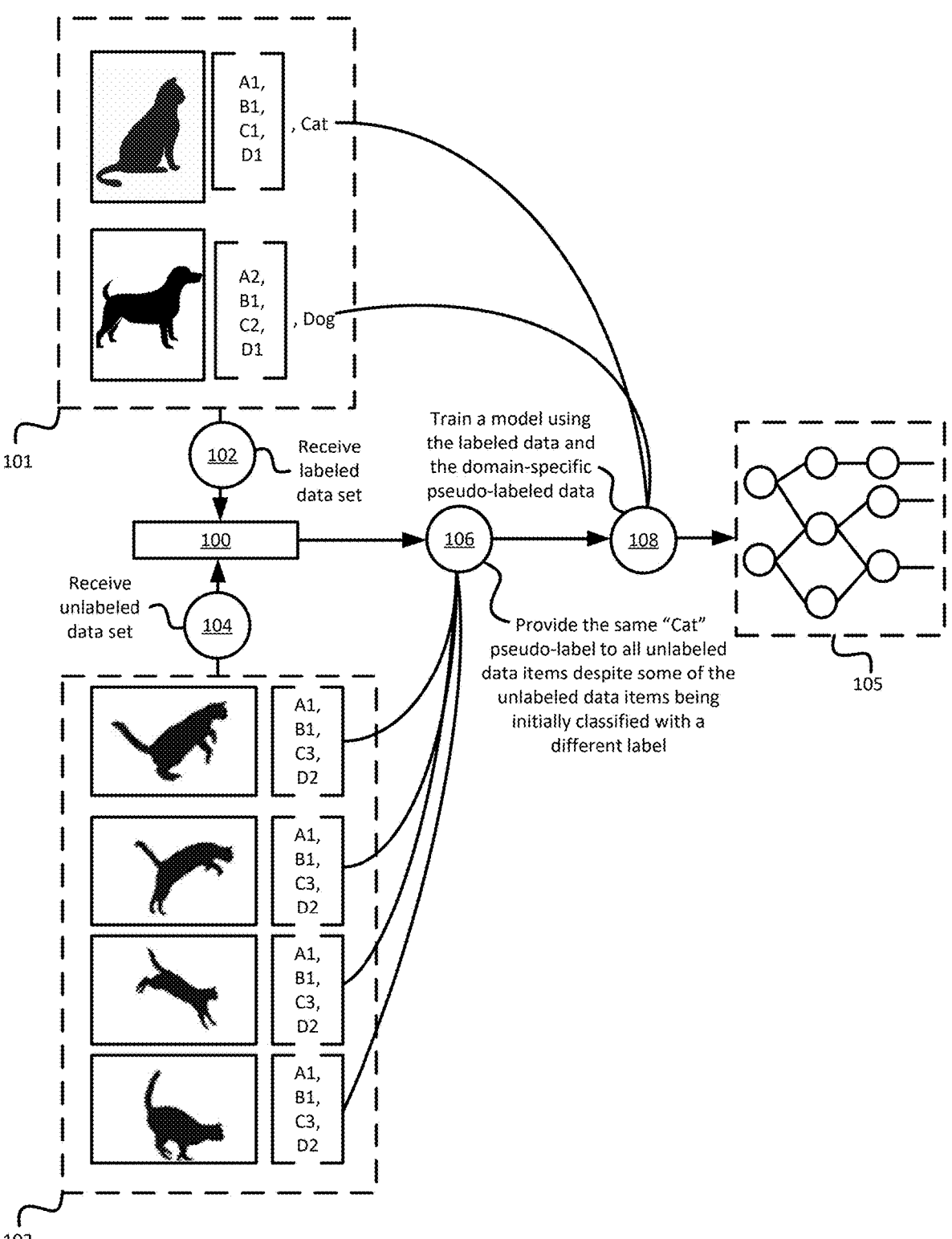
FIGS. 1A and 1B illustrate an example of one or more iterations of a domain-aware semi-supervised machine learning ("DSSL") procedure in accordance with some embodiments presented herein.

The following detailed description refers to the accompanying drawings. The same reference numbers in different drawings may identify the same or similar elements.

Embodiments described herein provide systems and methods for domain-aware semi-supervised machine learning ("DSSL") to train a model based on parameters and labels from a set of labeled data, and to expand a particular classification within the model to incorporate parameters from a first subset of unlabeled data that the model does not classify with the particular classification when a second subset of unlabeled the model classifies to the particular classification is in the same equivalence class or domain as the first subset of unlabeled data. The systems and methods may include using the resulting model for computer vision, object recognition, feature detection, pattern recognition, and/or other applications in which the expanded definition for the particular classification may be used to identify objects, features, and/or data patterns that include forms, coloring, sizes, postures, movements, expressions, perspectives, and/or other variations not found within the set of labeled data.

For example, embodiments described herein may be used in autonomous vehicles or semi-autonomous vehicles, in which image and/or video data captured by one or more cameras of such a vehicle may include unlabeled data (e.g., unlabeled image data). As discussed below, such unlabeled data may be analyzed based on one or more domains associated with the unlabeled data to identify objects, vehicles, road signs, pedestrians, etc. in order to control operation of the vehicle. For example, the vehicle may be controlled to avoid objects in the road (e.g., by applying braking inputs, throttle inputs, steering inputs, etc.), alert a driver or other user of the vehicle, etc. that are identified using techniques described herein.

In some embodiments, the domain-aware unsupervised learning may use a model that is trained on the first set of labeled data to determine that a majority of unlabeled data from the same equivalence class may be classified with a particular label from the first set of labeled data. Data of a particular "equivalence class" may include unlabeled data that is generated in sequence or within a particular interval of time, by the same instrument, at the same location, and/or with another type of common set of attributes. As such, a set of unlabeled data items within the same equivalence class may be identified as being associated with the same classification or set of classifications, as certain attributes of the set of unlabeled data may be invariant and/or unchanged among the set of unlabeled data. The domain-aware unsupervised learning may apply a pseudo-label to provide the same classification to all the unlabeled data items from that same equivalence class despite the model outputting different labels or classifications for one or more of the unlabeled data items in the same equivalence class. The domain-aware unsupervised learning may include iteratively resolving and/or modifying the model to incorporate parameters from the unlabeled data items of the same equivalence class that were previously not considered or used in classifying data with the particular label. In other words, the domain-aware unsupervised learning may use a classification model to assign a pseudo-label to a group of unlabeled data with specific domain commonality in which a majority of the unlabeled data from that group is classified to a first learned label, and may modify the modeling for the first learned label classification to include parameters from a subset of unlabeled data items in the group that were misclassified to a different second learned label. Accordingly, in some embodiments, the DSSL systems and methods may generate a positive feedback loop that leverages the known invariants in different groups of the second set of unlabeled data to refine and optimize the parameters, parameter combinations, weights, and/or pathways in the generated model for classifying unlabeled data with one or more of the learned labels from the labeled data set.

Figure 1B:
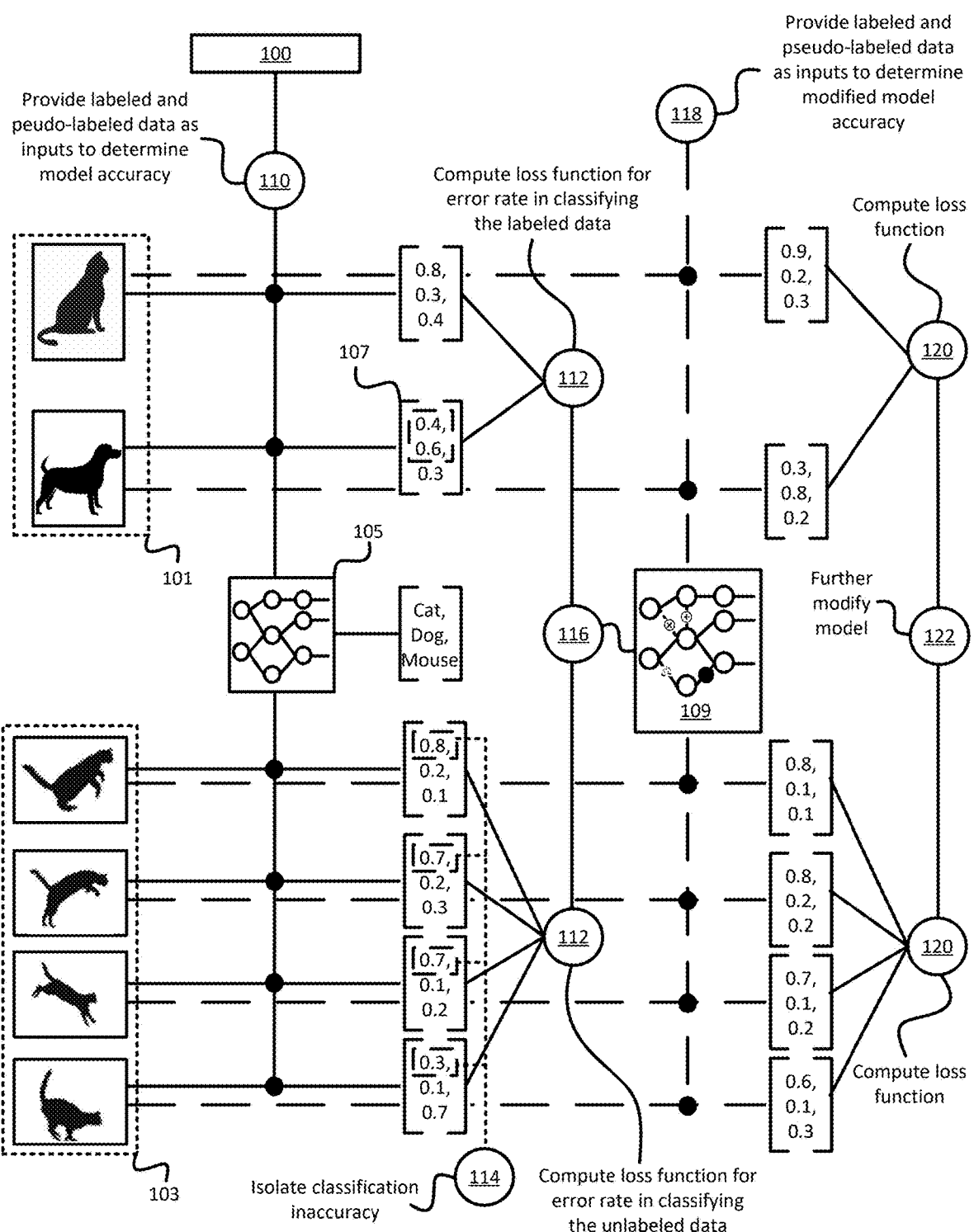

FIGS. 1A and 1B illustrates an example of one or more iterations of a DSSL procedure in accordance with some embodiments presented herein. The DSSL procedure may be implemented by DSSL system 100. As shown in FIG. 1A, DSSL system 100 may receive (at 102) data items included as part of first set of labeled data 101, and receiving (at 104) data items included as part of second set of unlabeled data 103.

The first set of labeled data 101 may include data items that have been annotated and/or otherwise associated with a desired label (e.g., a first set of labels associated with the first set of labeled data 101). The "desired" label may include an identifier that identifies one of several classifications that are specified for a given task. For example, if the task being performed in FIG. 1A is to determine whether an image contains a cat, a dog, and/or another animal (e.g., as indicated by the labels), a labeled data item example would consist of a pair (x,y) where x is an image and y is the desired label and/or correct classification for that image. The image may be represented as a set of parameters, encoded values, etc. that define the image and/or the properties of the object within the image. The parameters may include color values at different points in the image, patterns or shapes in the image, variation at different regions of the image, and/or other visual characteristics of the image. The first set of labels may be manually added to the first set of labeled data 101 based on a user visually inspecting each image of the first set of labeled data 101, and selecting a correct classification from the list of classifications that are defined for the task. In some embodiments, the first set of labels may have been generated automatically, such as by way of one or more artificial intelligence/machine learning ("AI/ML") techniques and/or in some other suitable automated manner.

The second set of unlabeled data 103 may include data items that have not been annotated and/or otherwise associated with a desired label and/or identifier. Accordingly, input provided by an unlabeled data item may include the image and/or the set of parameters that define the image (e.g., the "x" from the (x,y) pair) without the desired label and/or any classification for the image (e.g., the "y" from the (x,y) pair).

Due to the time, cost, and effort associated with manually labeling each data item of the first set of labeled data 101, the first set of labeled data 101 is likely to be orders of magnitude smaller than the second set of unlabeled data 103. In other words, DSSL system 100 may receive many fewer images of different animals that are labeled with the correct or desired animal classification (e.g., the first set of labeled data 101) than images of different animals that have no animal classification (e.g., the second set of unlabeled data 103) for DSSL system 100, machine, and/or other device to parse, extract, and/or otherwise directly obtain from the image or file.

Despite not being identified with any of labels or classification identifiers, the second set of unlabeled data 103 may be selected to be part of, or include, unlabeled data from a common domain or equivalence class. The domain may be defined as a common time period, a common instrument that generates the unlabeled data, a common location where the unlabeled data is generated, and/or other commonality between the unlabeled data in the second set of unlabeled data 103. For instance, a video clip captured via a camera, such as a vehicle dashboard camera ("dash-cam") and/or one or more cameras integrated within a vehicle or communicatively coupled to a vehicle control system, may have time domain commonality for a desired target since each of the images in a five second period are likely to feature the same object and/or target. As another example, different images received from the same user, device (e.g., a User Equipment ("UE"), such as a mobile phone or some other type of device), user group, or device group may have a user domain commonality and/or a device domain commonality.

As shown in FIG. 1A, the second set of unlabeled data 103 may include multiple images that are each a particular frame of a video depicting a particular animal performing a movement. As such, the second set of unlabeled data 103 may have time domain commonality, as the images may correspond to different frames associated with a particular time period (e.g., one second, three seconds, etc.) of the video. Accordingly, the same object (e.g., the particular animal) may be represented in each image of the second set of unlabeled data 103 with different parameters or some variety in the parameters. Moreover, one or more of the parameters of the second set of unlabeled data 103 may be similar or the same as parameters of at least one labeled example from the first set of labeled data 101, and one or more of the parameters of each unlabeled example from the second set of unlabeled data 103 may be different than parameters in each labeled example from the first set of labeled data 101.

Another example of time domain commonality may include a 15-second video clip produced by an outdoor camera. In the 15-second video clip, the weather is unlikely to experience a significant change, and therefore the images may have time domain commonality for the desired target being the weather.

Instrument domain commonality may refer to output that is produced by the same instrument, device, and/or sensor. If the task is to classify the object that is measured by that instrument, then the output from the instrument measuring the object will have instrument domain commonality and may be used to classify that object. For example, different sets of data measured, sensed, captured, etc. by the same make, model, type, etc. of a given sensor, instrument, or other device may have instrument domain commonality.

DSSL system 100 may exploit the domain commonality within the second set of unlabeled data 103 in order to define one or more pseudo-labels for the second set of unlabeled data 103. The same pseudo-label assigned to the second set of unlabeled data 103 may indicate that the unlabeled data items have domain commonality, are from the same equivalence class, and should have a common label or classification as a result. In some embodiments, the pseudo-label may be selected from the set of labels provided with the first set of labeled data 101. In some such embodiments, a distinction may be made between a pseudo-label and a learned label based on the same pseudo-label being used to classify a group of unlabeled data items from a particular equivalence class despite a classification model outputting different learned labels or classifications for some of the unlabeled data items in the group. In other words, an assigned pseudo-label may override the labels that may be initially output for one or more of the unlabeled data items from the same domain or equivalence class.

Defining the one or more pseudo-labels for the second set of unlabeled data 103 may include inspecting metadata, timestamps, and/or header information, performing image analysis, and/or evaluating other properties of the second set of unlabeled data 103 to determine that the second set of unlabeled data 103 includes unlabeled data from the same equivalence class or domain (e.g., time domain commonality, as discussed above). For instance, DSSL system 100 may determine that the second set of unlabeled data 103 illustrated in FIG. 1A have time domain commonality as a result of the second set of unlabeled data 103 including images from the same video and/or images that have a sequential numbering or naming.

DSSL system 100 may associate (at 106) a particular pseudo-label for all unlabeled data items of the second set of unlabeled data 103 based on the determined domain commonality. For instance, DSSL system 100 may input each unlabeled data item from the second set of unlabeled data 103 into a model that is initially trained using the first set of labeled data 101. The model may classify a majority or most of the unlabeled data items with a particular learned label from the first set of labeled data 101, and may classify other unlabeled data items from the second set of unlabeled data 103 with different learned labels or incorrect labels. DSSL system 100 may assign the particular learned label as the pseudo-label for all unlabeled data items despite the model classifying some of the unlabeled data items with a label that is different than the particular learned label. More specifically, the model may classify three of the four images from the second set of unlabeled data 103 as a "cat", may classify the fourth image as a "mouse", and DSSL system 100 may label all four images with the "cat" pseudo-label, thereby overriding the model classification for the fourth image based on the domain commonality inherent within the second set of unlabeled data 103.

In some embodiments, DSSL system 100 may perform a partitioning operation to separate different groups or subsets of unlabeled data from the second set of unlabeled data 103. For instance, DSSL system 100 may define a pseudo-label for sampled images from every 5 seconds of video, for sampled unlabeled data produced by a different sensor, for sampled unlabeled data produced at each different location, and/or for other methods of extracting domain commonality from the second set of unlabeled data 103. In other words, if the second set of unlabeled data 103 includes groups or subsets of unlabeled data with different domain commonality, then a pseudo-label may be defined for each group or subset of unlabeled data. Similarly, if the second set of unlabeled data 103 is from a single continuation capture (e.g., a one-hour video clip), DSSL system 100 may partition the second set of unlabeled data 103 into different groups or subsets (e.g., frames from a 5 second interval) in order to increase the domain accuracy and/or the likelihood that the same object is represented in each group or subset. In some embodiments, portions of the second set of unlabeled data 103 may be associated with multiple pseudo-labels. For example, a particular image of the unlabeled data 103 may be associated with two or more pseudo-labels, each associated with a different domain.

DSSL system 100 may train (at 108) a model based on parameters and labels of the first set of labeled data 101, and parameters and pseudo-labels of the second set of unlabeled data 103. Training (at 108) the model may include performing semi-supervised machine learning on the labeled and pseudo-labeled data sets 101 and 103.

The semi-supervised machine learning may include analyzing the labeled and pseudo-labeled data sets 101 and 103 in order to determine patterns and/or commonality (e.g., a measure of similarity and/or correlation) between parameters of data with matching labels and/or pseudo-labels, and generating, modifying, refining, training, etc. neural network model 105 to model the probability or likelihood that each of the determined patterns and/or commonality leads to at least one of the classifications represented by a learned label from the first set of labeled data 101. In some embodiments, generating neural network model 105 may include establishing connections and providing weights between different parameters of the labeled and pseudo-labeled data sets 101 and 103 to model the determined patterns and/or commonality and to specify a value for the probability or prediction that data having parameters represented by a node pathway of neural network model 105 is to be classified with the label specified for that node pathway. Training (at 108) the model may further include outputting a mapping function as a formulaic representation of neural network model 105.

In some embodiments, the model may associate actions to perform with respect to particular classifications of data. For example, a first classification may include a classification such as "pedestrian," which may be associated with an action to apply a full braking input to a vehicle with which the data is associated. As another example, a second classification may include a classification such as "traffic cone," which may be associated with an action to apply a steering input to the vehicle, which may cause the vehicle to swerve around the traffic cone. In practice, other types of actions or sets of actions may be associated with particular classifications that are determined with respect to unlabeled data using techniques described above. As such, associating parameters and/or pseudo-labels (e.g., associated with the same domain) with particular labels or classifications, as described herein, may further include modifying the model to indicate the corresponding actions associated with such parameters and/or pseudo-labels of unlabeled data (and/or a domain with which such unlabeled data is associated). Thus, when classifying unlabeled data using techniques described herein, the same and/or similar actions may be performed based on such classifications as actions that would be performed when identifying labeled data.

DSSL system 100 may iterate over itself in order to improve the predictive accuracy of the classifications generated by neural network model 105 and/or the mapping function. As shown in FIG. 1B, DSSL system 100 may provide (at 110) the first set of labeled data 101 and the pseudo-labeled second set of unlabeled data 103 as inputs to neural network model 105. DSSL system 100 may determine the accuracy of neural network model 105 in identifying the correct classifications (e.g., labels or pseudo-labels) for each of the first set of labeled data 101 and the second set of unlabeled data 103. In some embodiments, an accurate model with an acceptable error rate may output the target label associated with each of the first set of labeled data 101 and the second set of unlabeled data 103 with a probability that satisfies or exceeds a first threshold (e.g., greater than 75%) and other non-target labels with a probability that is less than a second threshold (e.g., less than 25%), wherein the target label for the first set of labeled data 101 is the label that is associated with the labeled data item being classified by model 105, and wherein the target label for the second set of unlabeled data 103 is the pseudo-label associated with each unlabeled data item from the same equivalence class of the second set of unlabeled data 103. For instance, neural network model 105 may be considered an accurate model if a labeled cat image from the first set of labeled data 101 or an unlabeled cat item from the pseudo-labeled second set of unlabeled data 103 is input into neural network model 105, and neural network model 105 outputs a vector that specifies the cat classification or label for the image with greater than a 75% probability.

To determine the predictive accuracy of neural network model 105, DSSL system 100 may compute (at 112) one or more loss functions based on the probability vector that is output for each of the labeled data 101 and the unlabeled data 103 provided (at 110) as inputs. The probability vector may specify a value between 0 and 1 for each of the labels specified as part of the first set of labeled data 101, with the value for a particular label representing the prediction that the input data should be classified with that particular label. The loss function may quantify the error rate based on the difference between the predicted labels (e.g., the probability vector) and the assigned label or pseudo-label of the input data. For instance, if the model classifies input data to a particular label with a 90% probability (e.g., a probability vector value of 0.9), and the input data is associated with a label or pseudo-label that matches that particular label, then the model is determined to have a 10% or 0.1 error rate for the classification of that input data. The loss function may compute the total error rate of the model based on the error rate between the predicted classification for each input data and the associated label or pseudo-label for that input data.

The loss function and/or the quantified error may also be used to isolate the one or more parameters or pathways within neural network model 105 that contributed to or were the cause of the error rate. For instance, if probability vector 107 for the labeled image of a dog includes too large of a value for a cat classification and too small of a value for a dog classification, then DSSL system 100 may determine that one or more parameters, connections, and/or weights in the dog classification pathway of neural network model 105 are insufficiently contributing to a dog label classification and overly contributing to a cat label classification, and may modify (at 116) neural network model 105 and/or the modeling therein accordingly.

The loss function and/or the quantified error for the second set of unlabeled data 103 may also provide similar insight for improving the neural network model 105 pathways leading to the different classification learned from the labeled data set 101. For example, if DSSL 100 associates the cat pseudo-label to all four images from the unlabeled set of data 103 because neural network model 105 classified three of the four images as a cat with a greater probability than any other classification and a particular unlabeled image of the four images as a "mouse" with a greater probability than any other classification, then DSSL 100 may determine (at 114) that neural network model 105 is inaccurate as the mouse classification output by model 105 for the particular unlabeled image is inaccurate. DSSL system 100 may use the loss functions to isolate new or different parameters of the particular unlabeled image that are not used for the cat classification in model 105, and may modify (at 116) neural network model 105 to incorporate and/or account for the new or different parameters of the particular unlabeled image in reaching the cat classification. In this example, modifying (at 116) neural network model 105 may include adjusting a set of parameters and/or the weighting of the set of parameters used by model 105 in classifying data to the cat label based on new and different parameters within the particular unlabeled image. Adjusting the set of parameters may include expanding the neural network model's parameterized definition of a cat, or expanding the model to identify a different type, coloring, size, posture, movement, expression, viewing perspective, body part, and/or other feature of a cat found in the particular unlabeled image that is not found in the other unlabeled images from the set of unlabeled images 103 or from the set of labeled images 101.

Modifying (at 116) neural network model 105 may include performing a backpropagation or optimization technique based on the predictive inaccuracies discovered from the loss functions computed (at 112) for the labeled and unlabeled data sets 101 and 103. Specifically, the backpropagation may include adjusting the parameters, connections between the parameters, weights, and/or other properties of the neural network predictive pathways that increased the error rates of the labels predicted for certain input. The backpropagation may produce modified neural network model 109 or modified mapping function that is optimized to produce more accurate predictions than the previous iteration of neural network model 105 and/or mapping function.

To determine whether modified neural network model 109 or the modified mapping function improves the classification accuracy relative to neural network model 105, DSSL system 100 may input (at 118) the first set of labeled data 101 and the second set of unlabeled data 103 into modified neural network model 109, may compute (at 120) the one or more loss functions based on the results, and may perform (at 122) the backpropagation to further modify and/or optimize the model (e.g., modified neural network model 109).

DSSL system 100 may continue to iterate over the model with each iteration further optimizing the classification accuracy until convergence is reached. Convergence may include a point at which additional modifications do not increase the accuracy of the model or when the output or classification accuracy of the model has a sufficiently low error rate.

Figure 2:
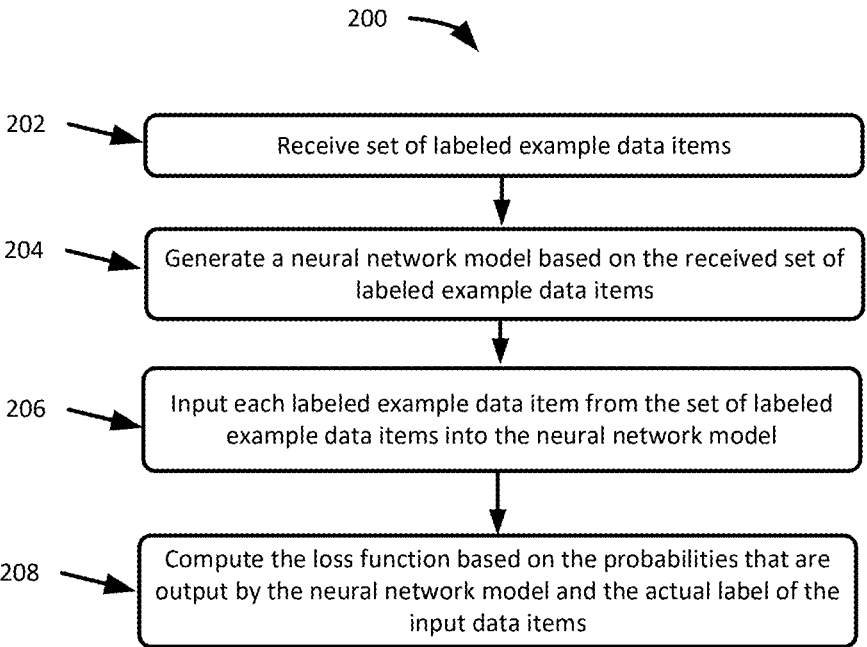
FIG. 2 presents a process for performing a supervised machine learning portion of the DSSL in accordance with some embodiments presented herein.

In some embodiments, the training (at 108) of the model and/or the semi-supervised machine learning may include supervised machine learning for modeling the first set of labeled data 101, and unsupervised machine learning for assigning the pseudo-labels and modeling the second set of unlabeled data based on the pseudo-labels. FIG. 2 presents a process 200 for performing the supervised machine learning portion of the DSSL in accordance with some embodiments presented herein. Process 200 may be implemented by DSSL system 100 or another system or device that is configured to perform the DSSL as disclosed herein.

Process 200 may include receiving (at 202) a batch or set of labeled data (e.g., data items with a label). The set of labeled data may be in the form of images, device or sensor output (e.g., output from accelerometers, microphones, inertial measurement units ("IMUs"), Global Positioning System ("GPS") circuits, etc.), movement or location data, and/or other data that has been manually classified with one or more labels specified for a particular classification task. For instance, the particular classification task may involve identifying an object or properties of an object that is identified in the images or that is represented in the data. The labels specified for the particular classification task may include target objects or target object properties that the model is trained to recognize from the received (at 202) set of labeled data.

Process 200 may include generating (at 204) a neural network model based on the received (at 202) set of labeled data. Generating (at 204) the neural network model may include defining a mapping function based on the labels within the set of labeled data, different combinations of parameters found within different subsets of data having the same label, weights assigned to each parameter of a particular combination based on the importance or frequency of that parameter in appearing in the labeled data having the same label, and/or probabilities for each weighted combination of parameters being present in data having the different labels within the set of labeled data. The mapping function may be represented as $f(x;\theta)$. Specifically, $x$ may represent the input data that is to be classified by the mapping function, and $\theta$ may represent the weighted combinations of parameters of the neural network model.

Process 200 may include inputting (at 206) each labeled example from the set of labeled data into the mapping function for the neural network model, and computing (at 208) a first loss function, $L_s(f(X;\theta),Y)$, based on the probabilities that are output by the model (e.g., outputs of $f(X;\theta)$) and the actual label of the input data (e.g., the Y parameter of the first loss function). In some embodiments, the first loss function may capture the error in the neural network model based on the accuracy with which the probability outputs of the mapping function specify the correct label or labels of the input data. In some embodiments, the first loss function may be computed using a mean square error, mean absolute error, quadratic loss, mean bias error, cross entropy loss, and/or another loss computation technique. For instance, the first loss function may be defined as:

$$L_S = 1/Bs \sum_{i=1}^{Bs} H(f(\alpha(x_i); \theta), y_i)$$

Bs may represent the set of labeled data with different labeled example data xi and corresponding labels or targets yi where $\alpha$ is a stochastic augmentation function and H is the loss for a single example.

FIG. 3 presents a process 300 for performing the unsupervised machine learning portion of the DSSL to define pseudo-labels for the unlabeled data and to train a model based on the pseudo-labels and the unlabeled data in accordance with some embodiments presented herein. Process 300 may be implemented by the same system or device that is configured to perform the supervised machine learning portion of the DSSL and/or process 200.

Process 300 may include receiving (at 302) receiving a batch or set of unlabeled data (e.g., data items without a label). The unlabeled data may be in the form of images, device or sensor output, movement or location data, and/or other data that has not been classified and that does not include a label, tag, annotation, and/or other identifier that identifies a classification for the unlabeled data.

Process 300 may include partitioning (at 304) the set of unlabeled data into different equivalence classes that have a consistent but unspecified label. Each equivalence class may include a group, subset, or sampling of unlabeled data from the set of unlabeled data that is within a common domain. For instance, U may represent the set of unlabeled data, and process 300 may include partitioning (at 304) U into equivalence classes $G^j \subset U$ that have a homogeneous but unspecified label. In some embodiments, the set of unlabeled data may include the same target object, and the partitioning (at 304) may be performed to divide the set of unlabeled data into smaller groups of unlabeled data for faster analysis or modeling. For instance, the weather in a 1-minute video clip is unlikely to change over that time domain, and the partitioning (at 304) may include dividing the 1-minute clip into 6 groups with a sampling of frames from each 10 second interval within the 1-minute clip such that each of the 6 groups from the same label-consistent set of unlabeled data may provide different views of the same sample or target in the unlabeled data (i.e., multiple views across time). For instance, a partitioned group of unlabeled data may include different images of the same object with a different position, from a different perspective, with different features, and/or with many of the same parameters but also some differing parameters from which the parameterized definition for that object may be expanded in a neural network model or mapping function. These differing parameters may also be used to measure the accuracy with which a neural network or mapping function is able to correctly classify each of the unlabeled data from the same group of unlabeled data with a common label or pseudo-label.

Process 300 may include inputting (at 306) a partitioned first group of unlabeled data to the mapping function and/or model trained with the set of labeled data. The mapping function and/or model may classify each unlabeled data item from the first group of unlabeled data to one of the labels specified for the set of labeled data. More specifically, the mapping function and/or model may output a vector that specifies probabilities for classifying each unlabeled data item to each of the labels specified for the set of labeled data with the highest probability value identifying the label for the determined classification.

Process 300 may include defining (at 308) a particular pseudo-label for the partitioned first group of unlabeled data based on the label or classification that is output by the model for the greatest number of unlabeled data items from the particular first group of unlabeled data and/or based on whichever label or classification is identified with the greatest accuracy for the particular first group of unlabeled data. In other words, defining (at 308) the particular pseudo-label may include overriding the classifications that are output by the model for some of the unlabeled data items and that are mismatched with the label or classification selected as the particular pseudo-label. For instance, a larger first subset of the first group of unlabeled data may be classified with a first label, a smaller second subset of the first group of unlabeled data may be classified with a second and/or other labels, and DSSL system 100 may define (at 308) the first label as the particular pseudo-label for all unlabeled data items of the first group of unlabeled data.

In some embodiments, defining (at 308) the particular pseudo-label may include aggregating the outputs and/or probabilities computed by the neural network model or mapping function over each example of unlabeled data in the first group $G^j$ to obtain a single pseudo-label $y^{\sim j}$ and a pseudo-label score $\sigma^j$ according to example Formula 1:

$$y^{\sim j}, \sigma^j = Agg(\{f(u;\theta):u \in G^j\}) \qquad \text{(Formula 1)}$$

Agg( ) may be an aggregation function over the set of predictions computed on each unlabeled example u from the first group of unlabeled data $G^j$. If the score $\sigma^j$ is greater than or equal to a quality threshold, the pseudo-label $y^{\sim j}$ may be selected as the particular pseudo-label to be used in computing a loss against unlabeled data from other differentiated groups of unlabeled data.

Process 300 may include computing (at 310) a loss based on the error between the classification predictions and/or probabilities that are output from the neural network model or mapping function when providing the unlabeled data from the other partitioned groups of unlabeled data as input into the model or mapping function and the particular pseudo-label being the correct classification for the unlabeled data from the other partitioned groups. An unsupervised loss function may be defined to compute (at 310) the loss. For instance, the unsupervised loss function may be defined in example Formula 2:

$$L_u^j = 1/n_u'' \sum_{u \in U''} H(f(\alpha(u); \theta), y^{\sim j}) \qquad \text{(Formula 2)}$$

U" may represent a second group of unlabeled data, $\alpha$ may represent a stochastic augmentation function, and H may represent the loss for a single example of unlabeled data from the second group of unlabeled data.

DSSL system 100 may combine the computed supervised loss from process 200 with the computed unsupervised loss function from process 300 in order to determine the total batch loss. DSSL system 100 may perform backpropagation based on the total batch loss.

The backpropagation may update the parameters θ for the one or more models that were previously trained and/or generated using the first set of labeled data and the second set of unlabeled data. The updated parameters may improve the predictive accuracy of the DSSL models. Different backpropagation techniques may be used to optimize the model. For instance, the Stochastic Gradient Descent ("SDG"), momentum algorithm, Adaptive Moment Estimation ("Adam"), or another optimization algorithm may be used to modify the neural network models.

In some embodiments, DSSL system 100 may iterate or repeat the loss computation and/or backpropagation until the modified model satisfies one or more convergence criteria. The convergence criteria may specify halting the backpropagation iterations once the predictions for the different labels and/or pseudo-labels are within an acceptable amount of loss or an acceptable error rate, after a specific number of optimization iterations are complete, and/or other metrics for determining when to stop the backpropagation iterations.

Figure 4:
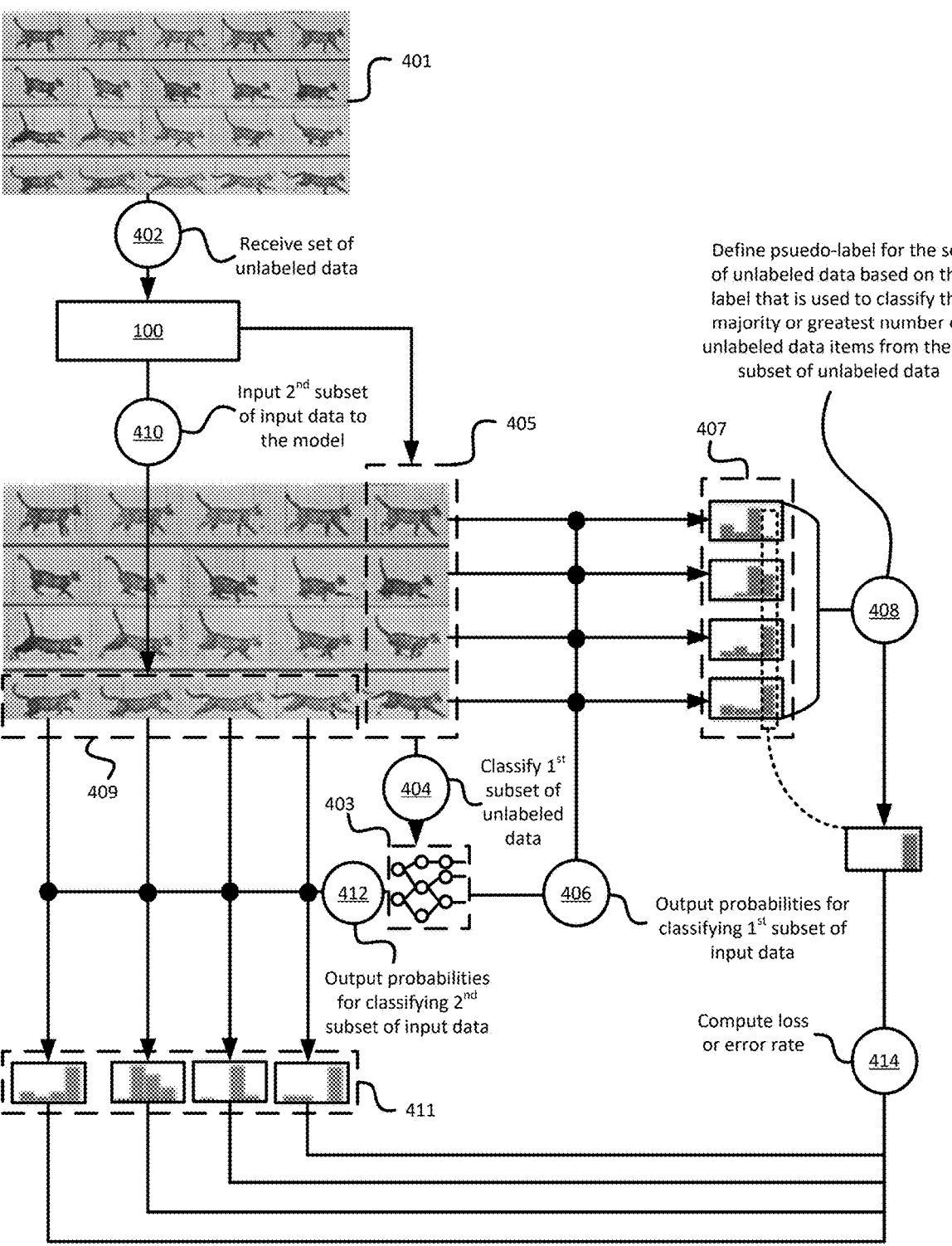
FIG. 4 illustrates an example for pseudo-label definition and modeling of unlabeled data in accordance with some embodiments presented herein.

FIG. 4 illustrates an example for pseudo-label definition and modeling of unlabeled data in accordance with some embodiments presented herein. FIG. 4 illustrates DSSL system 100 receiving (at 402) set of unlabeled data 401 that is comprised of different data items corresponding to frames from a video clip. The frames include different images from a common domain and/or the same target class. In other words, the frames are different views, positions, sizes, perspectives, and/or other variations of the same target object with the frames lacking any labels or identifiers for classifying the target object.

DSSL system 100 may classify (at 404) first sampling or subset of the unlabeled data 405 to different labels using model 403. Accordingly, model 403 may output (at 406) first set of probabilities 407 for each image of first subset of unlabeled data 405. Each probability from first set of probabilities 407 may specify a degree of certainty for classifying the input unlabeled data to one of several different classifications or labels. Specifically, model 403 may determine the degree with which parameters from first subset of unlabeled data 405 match to parameters of a different subsets of labeled data that are associated with a different classification or label, and that were used to train model 403.

DSSL system 100 may aggregate first set of probabilities 407 that is output by model 403 for each image of first subset of unlabeled data 405. DSSL system 100 may evaluate the aggregated first set of probabilities 407 in order to determine the label that is used to classify the majority or greatest number of unlabeled data items from first subset of unlabeled data 405. DSSL system 100 may define (at 408) a particular pseudo-label for each unlabeled data item of the received set of unlabeled data based on the label used to classify the majority or greatest number of unlabeled data items from first subset of unlabeled data 405.

DSSL system 100 may verify the accuracy of model 403 and/or the accuracy with which model 403 classifies other images from set of unlabeled data 401 with the particular pseudo-label. To do so, DSSL system 100 may input (at 410) second sampling or subset of unlabeled data 409 from set of unlabeled data 401 into model 403. Second subset of unlabeled data 409 may include a different set of frames or images than first subset of unlabeled data 405. Model 403 may output (at 412) second set of probabilities 411 for each image of second subset of unlabeled data 409. DSSL system 100 may determine (at 414) the accuracy with which second set of probabilities 411 classify the second subset of unlabeled data 409 with the particular pseudo-label. To determine (at 414) the accuracy, DSSL system 100 may compute the loss or error rate between the particular pseudo-label classification and second set of probabilities 411 from each image of second subset of unlabeled data 409.

DSSL system 100 may optimize the model by modifying parameter combinations, parameter weights, and/or other properties of model 403 to improve the accuracy with which model 403 classifies first subset of unlabeled data 405, second subset of unlabeled data 409, and/or other unlabeled data from set of unlabeled data 401 with the particular pseudo-label. As noted above, DSSL system 100 may use one or more backpropagation and/or model optimization techniques to identify and/or implement the changes that improve the classification accuracy of model 403. For instance, DSSL system 100 may receive a small set of images with labels that identify the target object as a cat. DSSL system 100 may generate a model that identifies a cat in an unlabeled image based on the limited set of parameters or differences found in the small set of labeled images. By incorporating the unsupervised machine learning portion, DSSL system 100 may identify new parameters or adjust the weight of the parameters from which to more accurately identify cats from other animals or from which to identify more types of cats not found in the labeled data set. For instance, DSSL system 100 may obtain a group of five unlabeled images that are part of a common domain or are from the same target class despite the classification for the domain or target class being unspecified. DSSL system 100 may determine that the earlier-trained model classifies most of the five unlabeled images (e.g., three or more of the five unlabeled images) with the cat label or classification, and assigns the cat pseudo-label to each of the five unlabeled images despite the model classifying some of the five images with a different label or classification. DSSL system 100 may incorporate each of the five unlabeled images as additional examples of a cat image with which to train or optimize the model. The resulting model may have an expanded parameterized definition of a cat that includes new or different parameters from the one or more unlabeled images that were not originally classified as cat but that were nevertheless labeled with the cat pseudo-label because of the domain commonality with the other five unlabeled images. The new or different parameters may expand the model's parameterized definition of a cat to identify a different type, coloring, size, posture, movement, expression, viewing perspective, body part, and/or other feature of a cat found in the one or more incorrectly classified unlabeled images with the cat pseudo-label. DSSL system 100 may continue to iterate and improve parameter combinations of the model used to classify each of the learned labels and to expand the model's ability to recognize each learned label with various differences that are not present in the labeled set of data.

DSSL system 100 may be adapted for different classification tasks beyond image classification, image segmentation, and/or image recognition. For instance, DSSL system 100 may receive a first set of vehicle acceleration data that is labeled to identify the different makes and models or types of vehicles producing that data, and may receive a second set of vehicle acceleration data that is not labeled. DSSL system 100 may generate a model based on the different acceleration profiles in the labeled and unlabeled data, and may classify each vehicle that produced the second set of vehicle acceleration according to the makes and models or vehicle types that have been labeled with a learned label from the labeled data set, and/or makes and models or vehicle types that have been labeled with a pseudo-label that matches one of the learned labels from the labeled data set. Accordingly, the labeled and unlabeled data sets may include images, audio, commands, numerical values, text, and/or other data, and the classification task may be customized and/or defined based on the type of labeled or unlabeled data provided to DSSL system 100.

In some embodiments, DSSL system 100 may perform the classification to facilitate the automated control of various systems and/or devices. FIG. 5 presents a process 500 for controlling a system or device based on actions determined from the DSSL classifications in accordance with some embodiments presented herein. Process 500 may be implemented by DSSL system 100 as part of a navigation system, vehicle guidance system, autonomous driving solution, and/or other systems.

Process 500 may include receiving (at 502) labeled and unlabeled data items from one or more sensors that are used to guide the operation of different devices (e.g., a fleet of vehicles). For instance, a sensor may include a camera integrated in, mounted to, etc. a vehicle such as an autonomous or semi-autonomous vehicle, and the labeled and unlabeled data items may include images captured by the camera. The unlabeled data items may include images and/or video, and a particular video frame, still image, set of video frames, set of still images from the video may each be considered as an unlabeled data item.

Process 500 may include generating (at 504) a model based on the DSSL performed over the received (at 502) labeled and unlabeled data. Once again, the unlabeled data items from a common domain may be grouped into an equivalence class and provided a common pseudo-label. The parameters from the pseudo-labeled group of data items may then be used to expand the parameterized definition for a particular classification or label within the model that matches the pseudo-label associated with the pseudo-labeled group of data items.

Process 500 may include receiving (at 506) unlabeled data items from a particular sensor of a particular device. In particular, DSSL system 100 may receive a real-time feed of images generated by the particular sensor as the particular device is in motion.

Process 500 may include classifying (at 508) the unlabeled data items using the generated (at 504) model. Classifying (at 508) the unlabeled data items may include identifying objects or features within the unlabeled data items. For instance, DSSL system 100 may detect road weather conditions, may detect road hazards, may detect traffic conditions, may track vehicle speed, and/or may track other vehicle movements and/or environmental conditions affecting the vehicle movement.

Process 500 may include controlling (at 510) the particular device based on the classification (at 508) of the unlabeled data items. Controlling (at 510) the particular device may include performing different actions based on the classification that affect operation of the particular device or a system that manages the particular device. For instance, controlling (at 510) the particular device may include adjusting navigational guidance provided to a driver or automated driving system to avoid certain detected road hazards or traffic situations. In some embodiments, controlling (at 510) the particular device may include outputting an alert to a user equipment ("UE"), such as a mobile phone that is located within or is communicatively coupled to a vehicle associated with the received (at 502) unlabeled data. For example, as discussed above, such a vehicle may include or may be communicatively coupled to one or more cameras that capture image and/or video data from areas surrounding the vehicle. In some embodiments, controlling (at 510) the particular device may include applying one or more controls or inputs to the vehicle, such as throttle inputs, braking inputs, steering inputs, etc. based on a location and/or type of object identified using techniques described above. Such inputs may cause the vehicle to swerve around the object, brake and/or speed up to avoid the object, etc. In some embodiments, controlling (at 510) the particular device may include adjusting estimated arrival times, requesting additional vehicles, and/or implementing other actions with respect to a fleet management system in response to determining that the classified road weather conditions may prevent an expected plan of action from being successfully completed.

In some embodiments, different sets of classifications of unlabeled data items (e.g., as performed at 508) may be associated with different actions. For example, a first classification may include a classification such as "pedestrian," which may be associated with an action to apply a full braking input to a vehicle with which the data is associated. As another example, a second classification may include a classification such as "traffic cone," which may be associated with an action to apply a steering input to the vehicle, which may cause the vehicle to swerve around the traffic cone. In practice, other types of actions or sets of actions may be associated with particular classifications that are determined with respect to unlabeled data using techniques described above.

Figure 6:
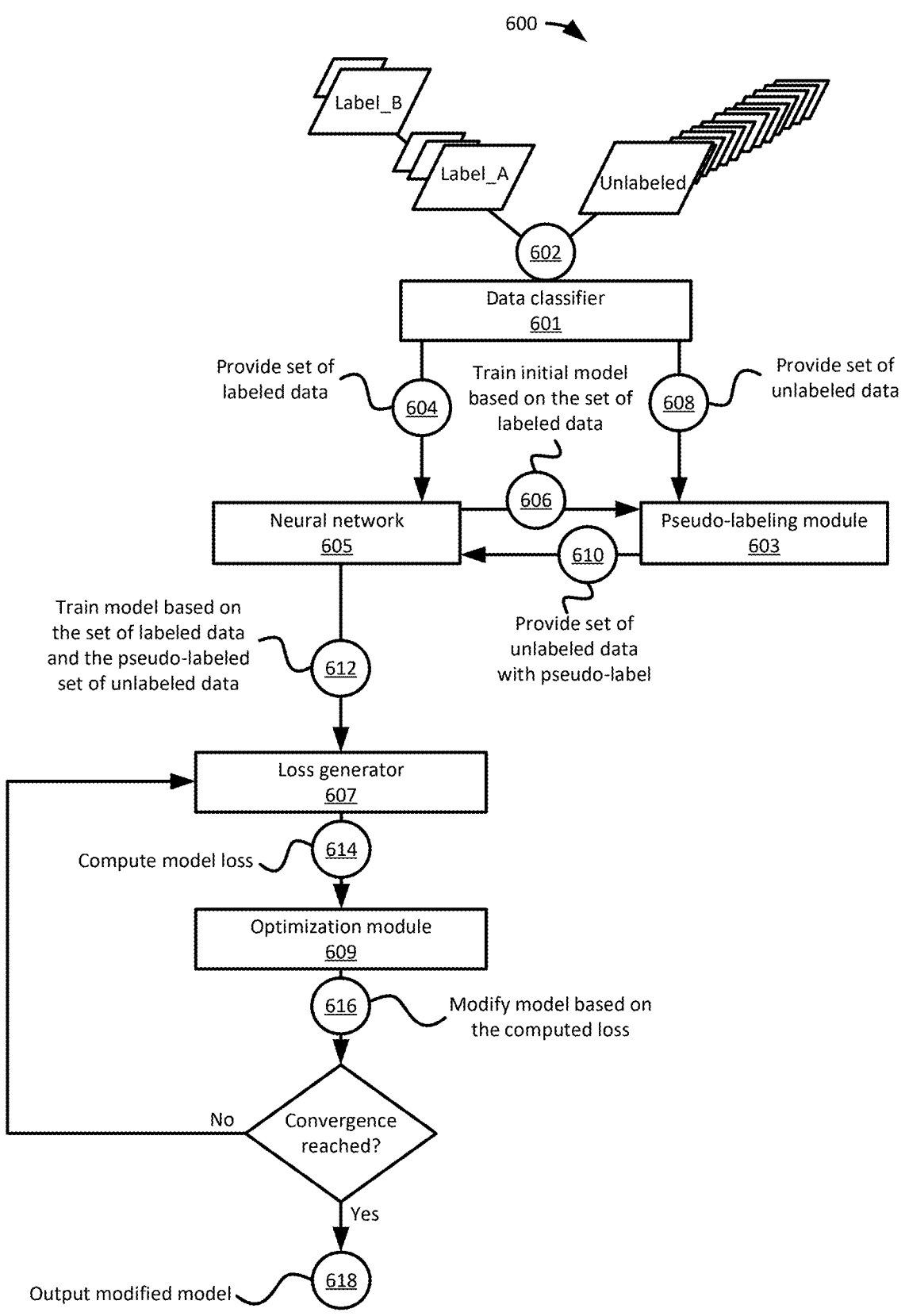
FIG. 6 illustrates an example architecture for generating, training, and/or optimizing a classification model based on a tandem supervised and unsupervised learning in accordance with some embodiments presented herein.

In some embodiments, to DSSL system 100 may perform the supervised learning on the labeled data set in tandem with or as part of the unsupervised learning on the unlabeled data set so that the cumulative set of results from the supervised learning and the unsupervised learning may be used to generate, train, and/or optimize the model. FIG. 6 illustrates an example architecture 600 of the DSSL system 100 for generating, training, and/or optimizing a classification model based on the tandem supervised and unsupervised learning in accordance with some embodiments presented herein.

Architecture 600 may include data classifier 601, pseudo-labeling module 603, neural network 605, loss generator 607, and optimization module 609. The quantity of modules and/or components, illustrated in FIG. 6, is provided for explanatory purposes only. In practice, architecture 600 may include additional modules and/or components, fewer modules and/or components, different modules and/or components, or differently arranged modules and/or components than illustrated in FIG. 6.

Data classifier 601 may receive and differentiate (at 602) a small first set of labeled data from a larger second set of unlabeled data. Data classifier 601 may differentiate (at 602) the data sets by inspecting the data to determine if the data includes a label or classification identifier.

Data classifier 601 may provide (at 604) the first set of labeled data to neural network 605, and neural network 605 may train (at 606) an initial model based on the labels and parameters associated with the first set of labeled data. Data classifier 601 may provide (at 608) the second set of unlabeled data to pseudo-labeling module 603.

Pseudo-labeling module 603 may partition the second set of unlabeled data into different subsets of unlabeled data that relate to the same target class and/or that represent a common domain, and may determine (at 610) a pseudo-label for the second set of unlabeled data based on the domain commonality and the most common classification that is output for a subset of unlabeled data by the initial model trained on the first set of labeled data. More specifically, pseudo-labeling module 603 may identify a subset of the unlabeled data that relate to a common classification, and may replace the classification that is output by the initial model with the particular classification (e.g., the pseudo-label) that is identified for a majority of the subset of unlabeled data items.

Neural network 605 may train (at 612) the model based on the set of labeled data and the pseudo-labeled set of unlabeled data. The inclusion of the pseudo-labeled set of unlabeled data expands the set of parameters that the model considers in classifying different objects, features, and/or data. The model may include different weighted parameter combinations that calculate the probability for classifying input data with certain parameters matching the parameters of the labeled and unlabeled data to each of the labels specified for the set of labeled data.

Loss generator 607 may compute a supervised loss based on the error rate with which the model classifies the labeled data with the correct corresponding labels, and may compute an unsupervised loss based on the error rate with which the model classifies the unlabeled data with the pseudo-label that is defined for the unlabeled data. Loss generator 607 may compute (at 614) total batch loss based on the supervised loss and unsupervised loss. The total batch loss may identify parameters or weights in the model that increase the probability of classifying the labeled data or unlabeled data to an incorrect label or pseudo-label, parameters or weights in the model that increase the probability of classifying the labeled data or unlabeled data to a correct label or pseudo-label, and/or parameters or weights that may expand or improve the classification of a particular label using parameters from unlabeled data in a particular subset of unlabeled data that is defined with a pseudo-label that matches the particular label but that is misclassified by the initial model with a label that is different than the particular label.

Optimization module 609 may optimize (at 616) the model based on the total batch loss and/or insights determined from the total batch loss. Optimization module 609 may use SDG, momentum algorithm, Adam, or another backpropagation technique to modify parameters, parameter weights, and/or generate new weighted parameter combinations within the model that more accurately classify input data to the correct label and/or that expand the classification to a particular label by incorporating new parameters or insights from unlabeled data that is misclassified with a different label but that is part of unlabeled data from a common domain that is defined with a pseudo-label that matches the particular label.

DSSL system 100 may determine if the modified model satisfies one or more convergence criteria. The convergence criteria may define a number of optimization iterations to perform on the model or an acceptable error rate with which the model classifies data to the specified labels and/or pseudo-labels. In response to the modified model not satisfying the convergence criteria, optimization module 609 may provide the modified model to loss generator 607 for another optimization and/or backpropagation iteration. In response to the modified model satisfying the convergence criteria, optimization module 609 may output (at 618) the modified model for use in classifying data for a particular classification task.

In some embodiments, DSSL system 100 may perform the supervised learning on the labeled data set and may generate a first model based on the labels from the labeled data separate from performing the unsupervised learning on the unlabeled data set and generating a second model based on the pseudo-labels from the unlabeled data. In some such embodiments, the first model and the second model may be combined and optimized to produce a single unified model that expands the classification of the learned labels based on new parameters of unlabeled data classified to a pseudo-label that is matched with one of the learned labels.

Figure 7:
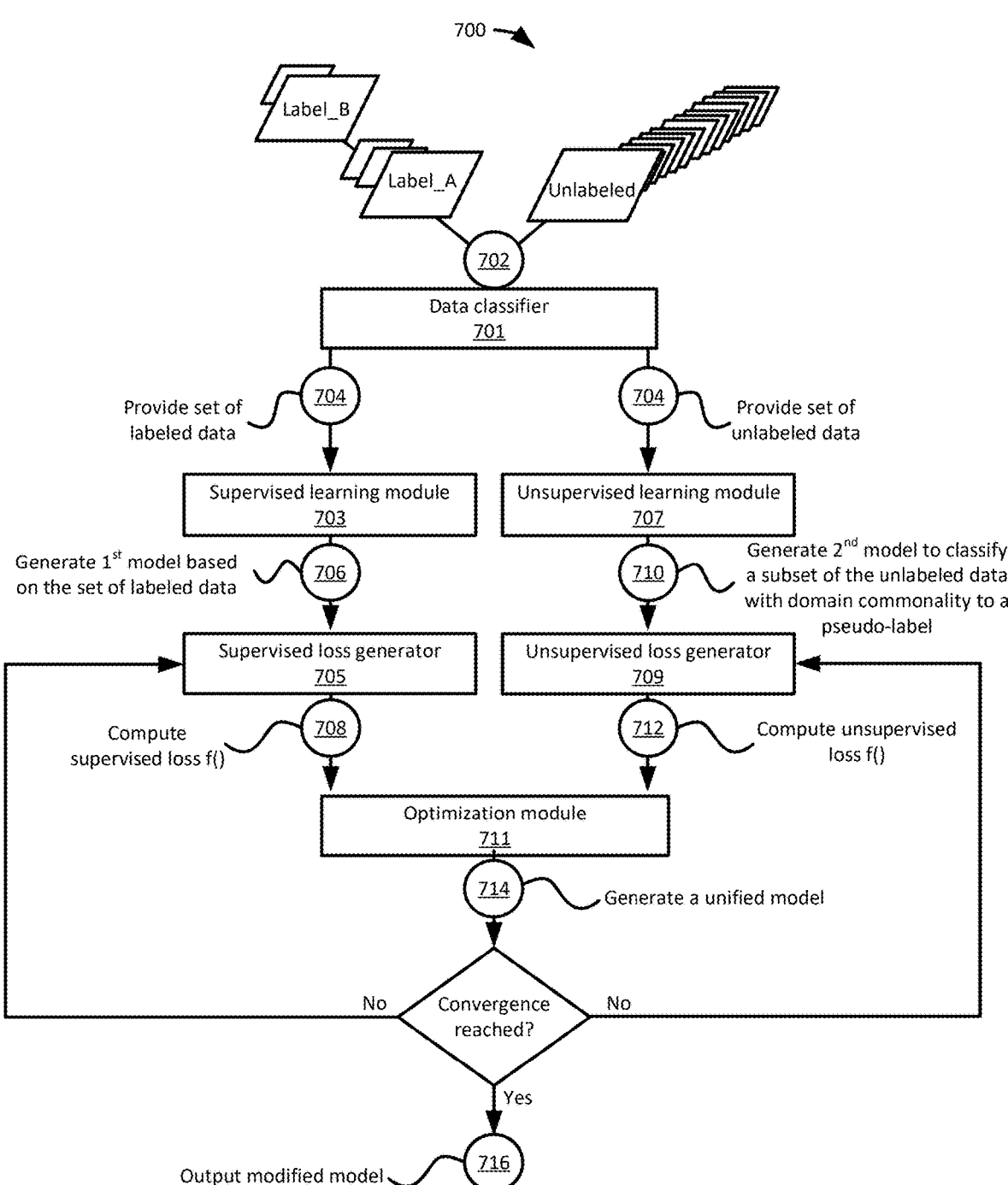
FIG. 7 illustrates an example architecture for generating, training, and/or optimizing a classification model based on separate modeling of the labeled and unlabeled data sets in accordance with some embodiments presented herein.

FIG. 7 illustrates an example architecture 700 of DSSL system 100 for generating, training, and/or optimizing a classification model based on separate modeling of the labeled and unlabeled data sets in accordance with some embodiments presented herein. Architecture 700 may include data classifier 701, supervised learning module 703, supervised loss generator 705, unsupervised learning module 707, unsupervised loss generator 709, and optimization module 711.

Data classifier 701 may receive and differentiate (at 702) a small first set of labeled data from a larger second set of unlabeled data. Data classifier 701 may provide (at 704) the first set of labeled data to supervised learning module 703, and the second set of unlabeled data to unsupervised learning module 707.

Supervised learning module 703 may correspond to a neural network that generates (at 706) a first model or mapping function based on the parameters and labels from the first set of labeled data. For instance, supervised learning module 703 may detect the different labels associated with the first set of labeled data, and may determine different weighted parameter combinations for classifying different data with the same particular label to that particular label with the greatest probability and/or classification accuracy.

Supervised loss generator 705 may compute (at 708) a supervised loss function for the first model. Computing (at 708) the supervised loss function may include calculating the loss or error rate between the probability values output from the first model for the first set of labeled data and the correct labels associated with the first set of labeled data.

Upon receiving (at 704) the second set of unlabeled data from data classifier 701, unsupervised learning module 707 may generate (at 710) a second model or mapping function based on the parameters and domain commonality from a first subset of the second set of unlabeled data. Unsupervised learning module 707 may aggregate the output by the second model for the first subset of unlabeled data to define a pseudo-label and a particular weighted parameter combination that identifies the pseudo-label for the first subset of unlabeled data with the highest probability or with at least a threshold probability.

Unsupervised loss generator 709 may compute (at 712) an unsupervised loss function for the second model. Computing (at 712) the unsupervised loss function may include computing the probability vector for other subsets of unlabeled data from the same equivalence class or domain as the first subset of unlabeled data using the second model, and calculating the loss or error rate between the probability vectors output by the second model for the other subsets of unlabeled data and the pseudo-label.

Optimization module 711 may generate (at 714) a unified model based on commonality detected between the learned labels classified by the first model and the pseudo-labels classified by the second model. Generating (at 714) the unified model may include combining the supervised loss function with the unsupervised loss function to calculate the total loss. From the total loss, optimization module 711 may detect pseudo-labels that match to or provide a similar classification as one or more of the learned labels from the set of labeled data, and may merge the pseudo-labels to the matching learned labels. Merging may include generating a unified model that expands or updates the weighted parameter combinations for classifying data with a particular learned label with new parameters or different weights from unlabeled data with a pseudo-label from the second model that is merged with the particular learned label.

Optimization module 711 may determine if the unified model satisfies one or more convergence criteria. In response to the convergence criteria not being satisfied, optimization module 711 may provide unified model to supervised loss generator 705 and unsupervised loss generator 709 so that the supervised loss function and unsupervised loss function may be computed for the unified model. Optimization module 711 may then apply additional modifications to the unified model to further improve the classification accuracy. In response to the convergence criteria being satisfied, optimization module 711 may output (at 716) the latest iteration of the unified model.

Figure 8:
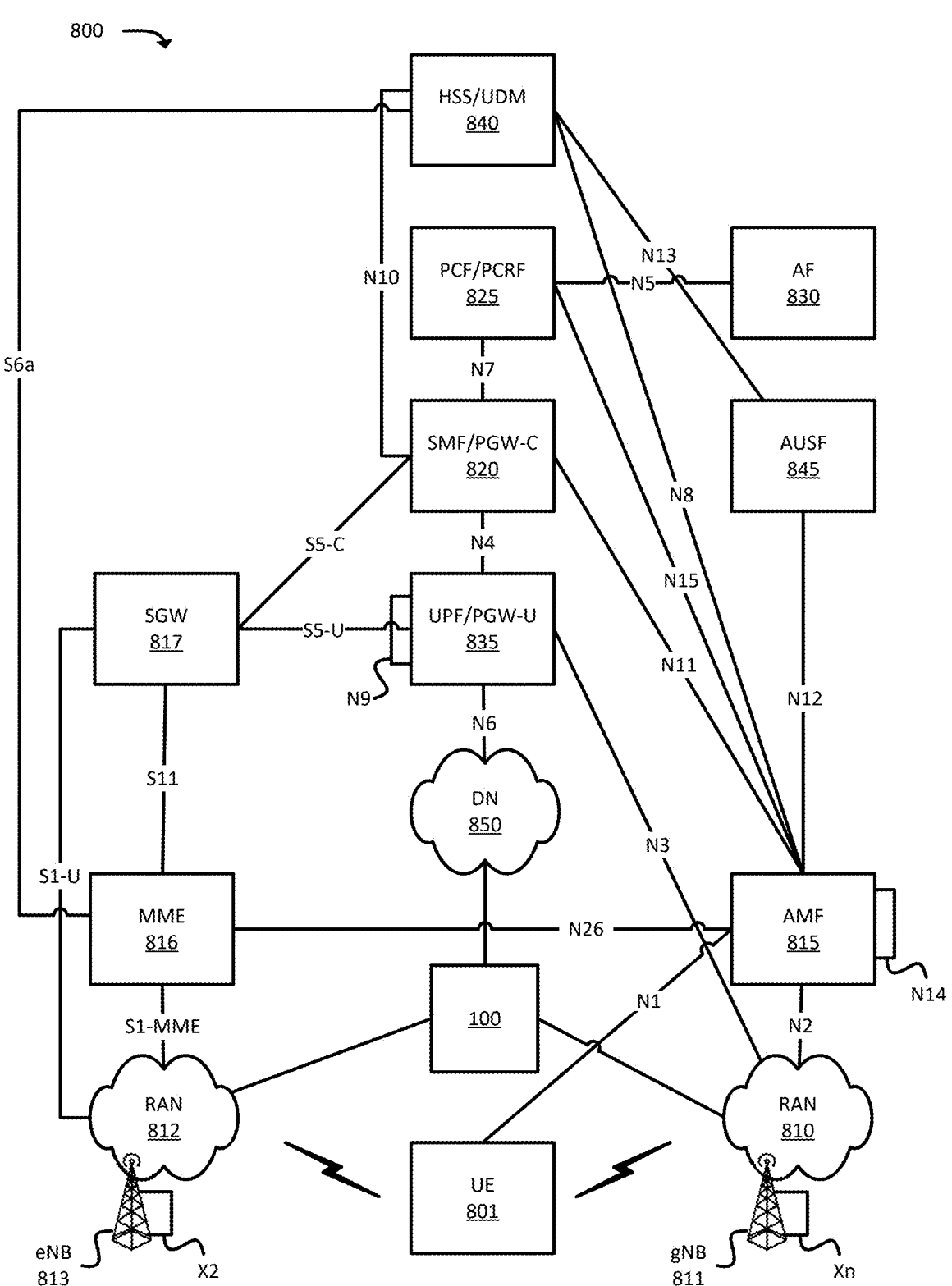
FIG. 8 illustrates an example environment, in which one or more embodiments may be implemented.

FIG. 8 illustrates an example environment 800, in which one or more embodiments may be implemented. In some embodiments, environment 800 may correspond to a Fifth Generation ("5G") network, and/or may include elements of a 5G network. In some embodiments, environment 800 may correspond to a 5G Non-Standalone ("NSA") architecture, in which a 5G radio access technology ("RAT") may be used in conjunction with one or more other RATs (e.g., a Long-Term Evolution ("LTE") RAT), and/or in which elements of a 5G core network may be implemented by, may be communicatively coupled with, and/or may include elements of another type of core network (e.g., an evolved packet core ("EPC")). As shown, environment 800 may include UE 801, RAN 810 (which may include one or more Next Generation Node Bs ("gNBs") 811), RAN 812 (which may include one or more one or more evolved Node Bs ("eNBs") 813), and various network functions such as Access and Mobility Management Function ("AMF") 815, Mobility Management Entity ("MME") 816, Serving Gateway ("SGW") 817, Session Management Function ("SMF")/Packet Data Network ("PDN") Gateway ("PGW")-Control plane function ("PGW-C") 820, Policy Control Function ("PCF")/Policy Charging and Rules Function ("PCRF") 825, Application Function ("AF") 830, User Plane Function ("UPF")/PGW-User plane function ("PGW-U") 835, Home Subscriber Server ("HSS")/Unified Data Management ("UDM") 840, and Authentication Server Function ("AUSF") 845. Environment 800 may also include one or more networks, such as Data Network ("DN") 850. Environment 800 may include one or more additional devices or systems communicatively coupled to one or more networks (e.g., DN 850), such as DSSL system 100.

The example shown in FIG. 8 illustrates one instance of each network component or function (e.g., one instance of SMF/PGW-C 820, PCF/PCRF 825, UPF/PGW-U 835, HSS/UDM 840, and/or 845). In practice, environment 800 may include multiple instances of such components or functions. For example, in some embodiments, environment 800 may include multiple "slices" of a core network, where each slice includes a discrete set of network functions (e.g., one slice may include a first instance of SMF/PGW-C 820, PCF/PCRF 825, UPF/PGW-U 835, HSS/UDM 840, and/or 845, while another slice may include a second instance of SMF/PGW-C 820, PCF/PCRF 825, UPF/PGW-U 835, HSS/UDM 840, and/or 845). The different slices may provide differentiated levels of service, such as service in accordance with different Quality of Service ("QoS") parameters.

The quantity of devices and/or networks, illustrated in FIG. 8, is provided for explanatory purposes only. In practice, environment 800 may include additional devices and/or networks, fewer devices and/or networks, different devices and/or networks, or differently arranged devices and/or networks than illustrated in FIG. 8. For example, while not shown, environment 800 may include devices that facilitate or enable communication between various components shown in environment 800, such as routers, modems, gateways, switches, hubs, front-end interfaces, etc. Alternatively, or additionally, one or more of the devices of environment 800 may perform one or more network functions described as being performed by another one or more of the devices of environment 800. Devices of environment 800 may interconnect with each other and/or other devices via wired connections, wireless connections, or a combination of wired and wireless connections. In some implementations, one or more devices of environment 800 may be physically integrated in, and/or may be physically attached to, one or more other devices of environment 800.

UE 801 may include a computation and communication device, such as a wireless mobile communication device that is capable of communicating with RAN 810, RAN 812, and/or DN 850. UE 801 may be, or may include, a radiotelephone, a personal communications system ("PCS") terminal (e.g., a device that combines a cellular radiotelephone with data processing and data communications capabilities), a personal digital assistant ("PDA") (e.g., a device that may include a radiotelephone, a pager, Internet/intranet access, etc.), a smart phone, a laptop computer, a tablet computer, a camera, a personal gaming system, an IoT device (e.g., a sensor, a smart home appliance, or the like), a wearable device, an Internet of Things ("IoT") device, a Machine-to-Machine ("M2M") device, or another type of mobile computation and communication device. UE 801 may send traffic to and/or receive traffic (e.g., user plane traffic) from DN 850 via RAN 810, RAN 812, and/or UPF/PGW-U 835. In some embodiments, UE 801 may include the devices that request different content, items, content types, or item types from a content or item platform within DN 850.

RAN 810 may be, or may include, a 5G RAN that includes one or more base stations (e.g., one or more gNBs 811), via which UE 801 may communicate with one or more other elements of environment 800. UE 801 may communicate with RAN 810 via an air interface (e.g., as provided by gNB 811). For instance, RAN 810 may receive traffic (e.g., voice call traffic, data traffic, messaging traffic, signaling traffic, etc.) from UE 801 via the air interface, and may communicate the traffic to UPF/PGW-U 835, and/or one or more other devices or networks. Similarly, RAN 810 may receive traffic intended for UE 801 (e.g., from UPF/PGW-U 835, AMF 815, and/or one or more other devices or networks) and may communicate the traffic to UE 801 via the air interface.

RAN 812 may be, or may include, a LTE RAN that includes one or more base stations (e.g., one or more eNBs 813), via which UE 801 may communicate with one or more other elements of environment 800. UE 801 may communicate with RAN 812 via an air interface (e.g., as provided by eNB 813). For instance, RAN 810 may receive traffic (e.g., voice call traffic, data traffic, messaging traffic, signaling traffic, etc.) from UE 801 via the air interface, and may communicate the traffic to UPF/PGW-U 835, and/or one or more other devices or networks. Similarly, RAN 810 may receive traffic intended for UE 801 (e.g., from UPF/PGW-U 835, SGW 817, and/or one or more other devices or networks) and may communicate the traffic to UE 801 via the air interface.

AMF 815 may include one or more devices, systems, Virtualized Network Functions ("VNFs"), etc., that perform operations to register UE 801 with the 5G network, to establish bearer channels associated with a session with UE 801, to hand off UE 801 from the 5G network to another network, to hand off UE 801 from the other network to the 5G network, manage mobility of UE 801 between RANs 810 and/or gNBs 811, and/or to perform other operations. In some embodiments, the 5G network may include multiple AMFs 815, which communicate with each other via the N14 interface (denoted in FIG. 8 by the line marked "N14" originating and terminating at AMF 815).

MME 816 may include one or more devices, systems, VNFs, etc., that perform operations to register UE 801 with the EPC, to establish bearer channels associated with a session with UE 801, to hand off UE 801 from the EPC to another network, to hand off UE 801 from another network to the EPC, manage mobility of UE 801 between RANs 812 and/or eNBs 813, and/or to perform other operations.

SGW 817 may include one or more devices, systems, VNFs, etc., that aggregate traffic received from one or more eNBs 813 and send the aggregated traffic to an external network or device via UPF/PGW-U 835. Additionally, SGW 817 may aggregate traffic received from one or more UPF/PGW-Us 835 and may send the aggregated traffic to one or more eNBs 813. SGW 817 may operate as an anchor for the user plane during inter-eNB handovers and as an anchor for mobility between different telecommunication networks or RANs (e.g., RANs 810 and 812).

SMF/PGW-C 820 may include one or more devices, systems, VNFs, etc., that gather, process, store, and/or provide information in a manner described herein. SMF/PGW-C 820 may, for example, facilitate the establishment of communication sessions on behalf of UE 801. In some embodiments, the establishment of communications sessions may be performed in accordance with one or more policies provided by PCF/PCRF 825.

PCF/PCRF 825 may include one or more devices, systems, VNFs, etc., that aggregate information to and from the 5G network and/or other sources. PCF/PCRF 825 may receive information regarding policies and/or subscriptions from one or more sources, such as subscriber databases and/or from one or more users (such as, for example, an administrator associated with PCF/PCRF 825).

AF 830 may include one or more devices, systems, VNFs, etc., that receive, store, and/or provide information that may be used in determining parameters (e.g., quality of service parameters, charging parameters, or the like) for certain applications.

UPF/PGW-U 835 may include one or more devices, systems, VNFs, etc., that receive, store, and/or provide data (e.g., user plane data). For example, UPF/PGW-U 835 may receive user plane data (e.g., voice call traffic, data traffic, etc.), destined for UE 801, from DN 850, and may forward the user plane data toward UE 801 (e.g., via RAN 810, SMF/PGW-C 820, and/or one or more other devices). In some embodiments, multiple UPFs 835 may be deployed (e.g., in different geographical locations), and the delivery of content to UE 801 may be coordinated via the N8 interface (e.g., as denoted in FIG. 8 by the line marked "N9" originating and terminating at UPF/PGW-U 835). Similarly, UPF/PGW-U 835 may receive traffic from UE 801 (e.g., via RAN 810, SMF/PGW-C 820, and/or one or more other devices), and may forward the traffic toward DN 850. In some embodiments, UPF/PGW-U 835 may communicate (e.g., via the N4 interface) with SMF/PGW-C 820, regarding user plane data processed by UPF/PGW-U 835.

HSS/UDM 840 and AUSF 845 may include one or more devices, systems, VNFs, etc., that manage, update, and/or store, in one or more memory devices associated with AUSF 845 and/or HSS/UDM 840, profile information associated with a subscriber. AUSF 845 and/or HSS/UDM 840 may perform authentication, authorization, and/or accounting operations associated with the subscriber and/or a communication session with UE 801.

DN 850 may include one or more wired and/or wireless networks. For example, DN 850 may include an Internet Protocol ("IP")-based PDN, a wide area network ("WAN") such as the Internet, a private enterprise network, and/or one or more other networks. UE 801 may communicate, through DN 850, with data servers, other UEs 801, and/or to other servers or applications that are coupled to DN 850. For instance, UEs 801 may issue requests for different content or items from one or more platforms located within DN 850. DN 850 may be connected to one or more other networks, such as a public switched telephone network ("PSTN"), a public land mobile network ("PLMN"), and/or another network. DN 850 may be connected to one or more devices, such as content providers, applications, web servers, and/or other devices, with which UE 801 may communicate.

DSSL system 100 may interface with one or more content or item distribution platforms in DN 850 in order to perform one or more classification tasks for those platforms. In some embodiments, DSSL system 100 may be located at the network edge or at different Multi-Access/Mobile Edge Computing ("MEC") sites of the network.

Figure 9:
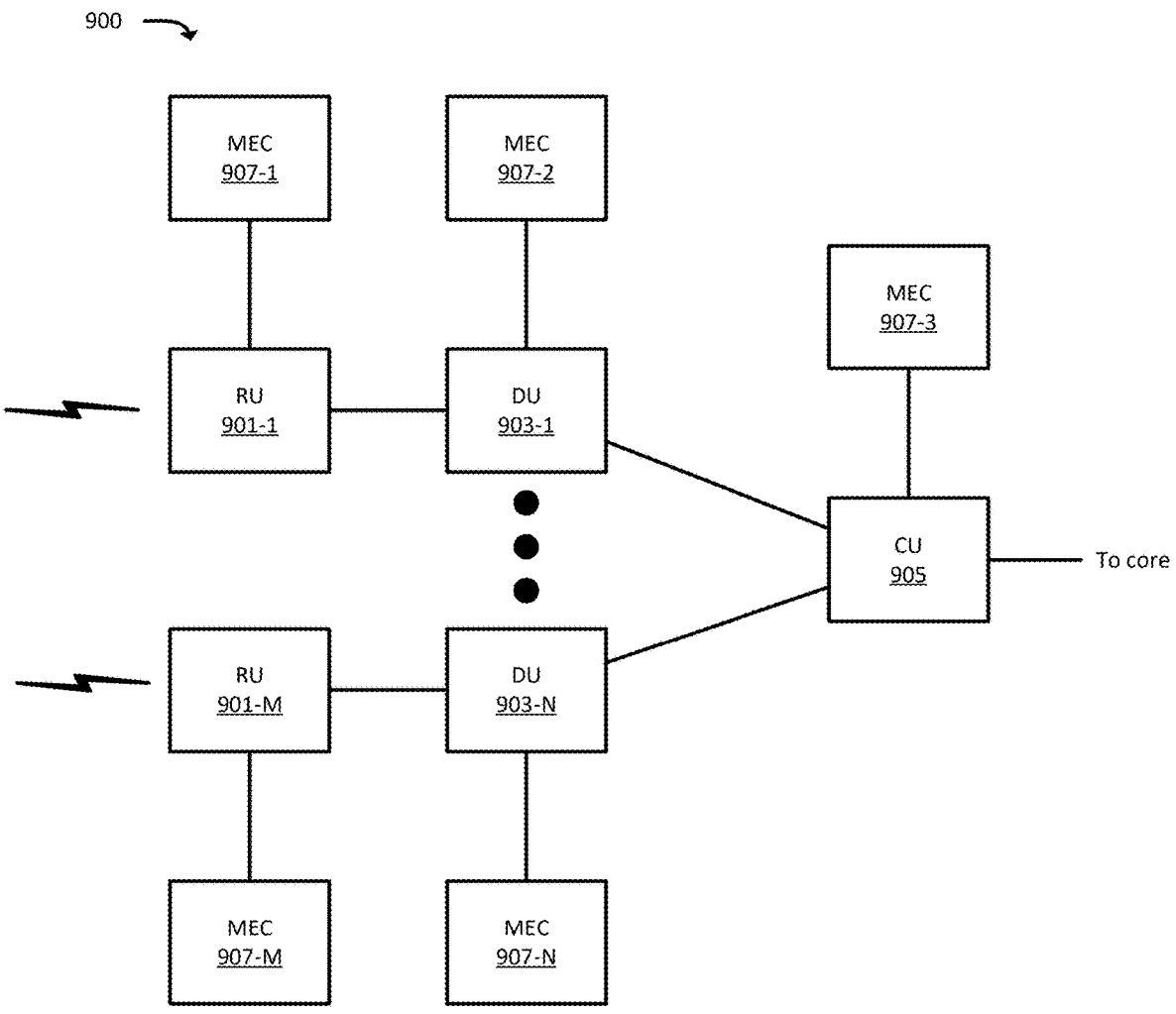
FIG. 9 illustrates an example arrangement of a Radio Access Network ("RAN"), in accordance with some embodiments.

FIG. 9 illustrates an example Distributed Unit ("DU") network 900, which may be included in and/or implemented by one or more RANs (e.g., RAN 810, RAN 812, or some other RAN). In some embodiments, a particular RAN may include one DU network 900. In some embodiments, a particular RAN may include multiple DU networks 900. In some embodiments, DU network 900 may correspond to a particular gNB 811 of a 5G RAN (e.g., RAN 810). In some embodiments, DU network 900 may correspond to multiple gNBs 811. In some embodiments, DU network 900 may correspond to one or more other types of base stations of one or more other types of RANs. As shown, DU network 900 may include Central Unit ("CU") 905, one or more Distributed Units ("DUs") 903-1 through 903-N (referred to individually as "DU 903," or collectively as "DUs 903"), and one or more Radio Units ("Rus") 901-1 through 901-M (referred to individually as "RU 901," or collectively as "RUs 901").

CU 905 may communicate with a core of a wireless network (e.g., may communicate with one or more of the devices or systems described above with respect to FIG. 8, such as AMF 815 and/or UPF/PGW-U 835). In the uplink direction (e.g., for traffic from UEs 801 to a core network), CU 905 may aggregate traffic from DUs 903, and forward the aggregated traffic to the core network. In some embodiments, CU 905 may receive traffic according to a given protocol (e.g., Radio Link Control ("RLC")) from DUs 903, and may perform higher-layer processing (e.g., may aggregate/process RLC packets and generate Packet Data Convergence Protocol ("PDCP") packets based on the RLC packets) on the traffic received from DUs 903.

In accordance with some embodiments, CU 905 may receive downlink traffic (e.g., traffic from the core network) for a particular UE 801, and may determine which DU(s) 903 should receive the downlink traffic. DU 903 may include one or more devices that transmit traffic between a core network (e.g., via CU 905) and UE 801 (e.g., via a respective RU 901). DU 903 may, for example, receive traffic from RU 901 at a first layer (e.g., physical ("PHY") layer traffic, or lower PHY layer traffic), and may process/aggregate the traffic to a second layer (e.g., upper PHY and/or RLC). DU 903 may receive traffic from CU 905 at the second layer, may process the traffic to the first layer, and provide the processed traffic to a respective RU 901 for transmission to UE 801.

RU 901 may include hardware circuitry (e.g., one or more RF transceivers, antennas, radios, and/or other suitable hardware) to communicate wirelessly (e.g., via an RF interface) with one or more UEs 801, one or more other DUs 903 (e.g., via RUs 901 associated with DUs 903), and/or any other suitable type of device. In the uplink direction, RU 901 may receive traffic from UE 801 and/or another DU 903 via the RF interface and may provide the traffic to DU 903. In the downlink direction, RU 901 may receive traffic from DU 903, and may provide the traffic to UE 801 and/or another DU 903.

RUs 901 may, in some embodiments, be communicatively coupled to one or more MEC devices or sites, referred to sometimes herein simply as "MECs" 907. For example, RU 901-1 may be communicatively coupled to MEC 907-1, RU 901-M may be communicatively coupled to MEC 907-M, DU 903-1 may be communicatively coupled to MEC 907-2, DU 903-N may be communicatively coupled to MEC 907-N, CU 905 may be communicatively coupled to MEC 907-3, and so on. MECs 907 may include hardware resources (e.g., configurable or provisionable hardware resources) that may be configured to provide services and/or otherwise process traffic to and/or from UE 801, via a respective RU 901.

For example, RU 901-1 may route some traffic, from UE 801, to MEC 907-1 instead of to a core network (e.g., via DU 903 and CU 905). MEC 907-1 may process the traffic, perform one or more computations based on the received traffic, and may provide traffic to UE 801 via RU 901-1. In this manner, ultra-low latency services may be provided to UE 801, as traffic does not need to traverse DU 903, CU 905, and an intervening backhaul network between DU network 900 and the core network. In some embodiments, MEC 907 may include, and/or may implement, some or all of the functionality described above with respect to DSSL system 100.

Figure 10:
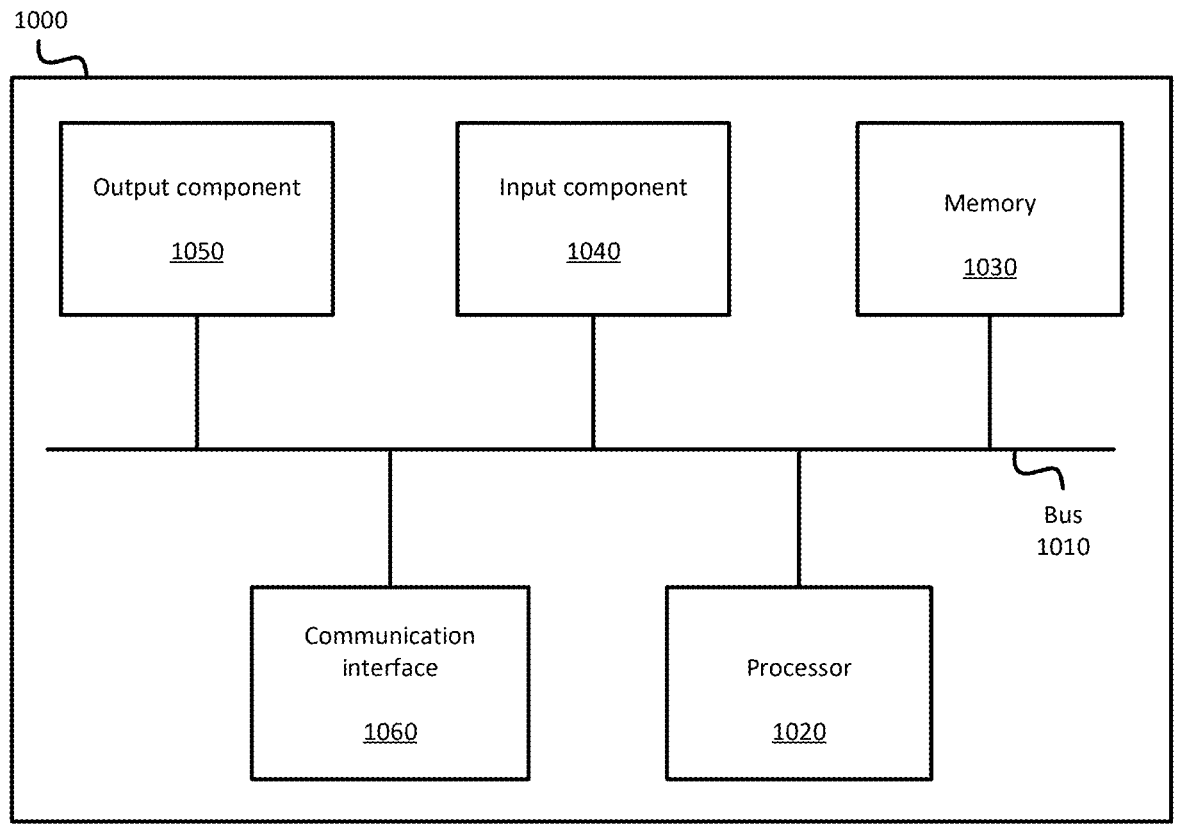
FIG. 10 illustrates example components of one or more devices, in accordance with one or more embodiments described herein.

FIG. 10 illustrates example components of device 1000. One or more of the devices described above may include one or more devices 1000. Device 1000 may include bus 1010, processor 1020, memory 1030, input component 1040, output component 1050, and communication interface 1060. In another implementation, device 1000 may include additional, fewer, different, or differently arranged components.

Bus 1010 may include one or more communication paths that permit communication among the components of device 1000. Processor 1020 may include a processor, microprocessor, or processing logic that may interpret and execute instructions. Memory 1030 may include any type of dynamic storage device that may store information and instructions for execution by processor 1020, and/or any type of non-volatile storage device that may store information for use by processor 1020.

Input component 1040 may include a mechanism that permits an operator to input information to device 1000 and/or other receives or detects input from a source external to 1040, such as a touchpad, a touchscreen, a keyboard, a keypad, a button, a switch, a microphone or other audio input component, etc. In some embodiments, input component 1040 may include, or may be communicatively coupled to, one or more sensors, such as a motion sensor (e.g., which may be or may include a gyroscope, accelerometer, or the like), a location sensor (e.g., a Global Positioning System ("GPS")-based location sensor or some other suitable type of location sensor or location determination component), a thermometer, a barometer, and/or some other type of sensor.

Output component 1050 may include a mechanism that outputs information to the operator, such as a display, a speaker, one or more light emitting diodes ("LEDs"), etc.

Communication interface 1060 may include any transceiver-like mechanism that enables device 1000 to communicate with other devices and/or systems. For example, communication interface 1060 may include an Ethernet interface, an optical interface, a coaxial interface, or the like. Communication interface 1060 may include a wireless communication device, such as an infrared ("IR") receiver, a Bluetooth® radio, or the like. The wireless communication device may be coupled to an external device, such as a remote control, a wireless keyboard, a mobile telephone, etc. In some embodiments, device 1000 may include more than one communication interface 1060. For instance, device 1000 may include an optical interface and an Ethernet interface.

Device 1000 may perform certain operations relating to one or more processes described above. Device 1000 may perform these operations in response to processor 1020 executing software instructions stored in a computer-readable medium, such as memory 1030. A computer-readable medium may be defined as a non-transitory memory device. A memory device may include space within a single physical memory device or spread across multiple physical memory devices. The software instructions may be read into memory 1030 from another computer-readable medium or from another device. The software instructions stored in memory 1030 may cause processor 1020 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations.

For example, while series of blocks and/or signals have been described above (e.g., with regard to FIGS. 1-6), the order of the blocks and/or signals may be modified in other implementations. Further, non-dependent blocks and/or signals may be performed in parallel. Additionally, while the figures have been described in the context of particular devices performing particular acts, in practice, one or more other devices may perform some or all of these acts in lieu of, or in addition to, the above-mentioned devices.

The actual software code or specialized control hardware used to implement an embodiment is not limiting of the embodiment. Thus, the operation and behavior of the embodiment has been described without reference to the specific software code, it being understood that software and control hardware may be designed based on the description herein.

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown, in practice, additional, fewer, or different, connections or devices may be used. Furthermore, while various devices and networks are shown separately, in practice, the functionality of multiple devices may be performed by a single device, or the functionality of one device may be performed by multiple devices. Further, multiple ones of the illustrated networks may be included in a single network, or a particular network may include multiple networks. Further, while some devices are shown as communicating with a network, some such devices may be incorporated, in whole or in part, as a part of the network.

To the extent the aforementioned implementations collect, store, or employ personal information of individuals, groups or other entities, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various access control, encryption and anonymization techniques for particularly sensitive information.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A device, comprising:
one or more processors configured to:
 receive a set of image data that includes a plurality of images;
 identify a machine learning model that associates a set of parameters to a first classification;
 compare parameters of each image, of the plurality of images, to the set of parameters included in the machine learning model;
 determine, based on the comparing, that a first subset of images, of the plurality of images, are associated with the first classification;
 determine, based on the comparing, that a second subset of images, of the plurality of images, are associated with a second classification and are not associated with the first classification;

identify one or more parameters of the second subset of images that are different from the set of parameters included in the machine learning model;
 modify the machine learning model to associate, based on identifying that the one or more parameters of the second subset of images are different from the set of parameters included in the machine learning model, the one or more parameters of the second subset of images with the first classification;
 identify a set of actions associated with the first classification, wherein the set of actions include one or more vehicle control actions;
 receive particular image data captured by a camera associated with a particular vehicle;
 determine that that the particular image data is associated with the one or more parameters of the second subset of images;
 determine, based on the modified machine learning model and based on determining that the particular image data is associated with the one or more parameters of the second subset of images, that the particular image data is associated with the first classification; and
 perform the set of actions, associated with the first classification, based on determining that the particular image data is associated with the first classification, wherein performing the set of actions includes outputting instructions to the particular vehicle to perform the one or more vehicle control actions of the set of actions associated with the first classification.

2. The device of claim 1, wherein the one or more processors are further configured to:
 train the machine learning model based on parameters of a set of labeled data and a plurality of classifications associated with each data item of the set of labeled data, wherein plurality of classifications comprises the first classification.

3. The device of claim 1, wherein the one or more processors are further configured to:
 compute an error rate of the machine learning model based on the first classification assigned to the set of image data and probabilities with which the machine learning model classifies the set of image data with the first classification; and
 select one or more parameters of the set of parameters to adjust based on the error rate.

4. The device of claim 1, wherein the one or more processors are further configured to:
 define a pseudo-label for the plurality of images of the set of image data based on the first subset of images being classified by the machine learning model to the first classification, the second subset of the plurality of images being classified by the machine learning model to second classification, each image of the first subset of images being associated with a same particular domain, and the first subset of images having a greater quantity of images than the second subset of images.

5. The device of claim 4, wherein defining the pseudo-label comprises:
 replacing a first label that is defined for the second classification and that is output by the machine learning model for the second subset of the first subset of images with a different second label that is defined for the pseudo-label and the first classification.

6. The device of claim 1, wherein the one or more processors are further configured to:

train the machine learning model using a first set of images that are labeled with the first classification, wherein the set of data comprises a different second set of images that are not labeled with a classification.

7. The device of claim 6, wherein the one or more processors are further configured to:

modify the machine learning model by expanding a parameterized definition of a particular object represented by the first set of images to include the one or more parameters from a subset of the second set of images that correspond to the second subset of images.

8. The device of claim 1, wherein the one or more processors are further configured to:

determine whether the machine learning model satisfies convergence criteria, wherein the convergence criteria sets a threshold error rate for the machine learning model or specifies a number of optimization iterations for the machine learning model; and optimize the machine learning model by adjusting additional parameters of the set of parameters in response to the machine learning model, after said modifying, not satisfying the convergence criteria.

9. The device of claim 1, wherein the one or more processors are further configured to:

detect a particular object depicted in the particular set of image data captured by the camera associated with the particular vehicle based on determining that the particular image data is associated with the first classification, wherein the set of actions are associated with detection of the particular object.

10. A non-transitory computer-readable medium, storing a plurality of processor-executable instructions to:

receive a set of image data that includes a plurality of images;

identify a machine learning model that associates a set of parameters to a first classification;

compare parameters of each image, of the plurality of images, to the set of parameters included in the machine learning model;

determine, based on the comparing, that a first subset of images, of the plurality of images, are associated with the first classification;

determine, based on the comparing, that a second subset of images, of the plurality of images, are associated with a second classification and are not associated with the first classification;

identify one or more parameters of the second subset of images that are different from the set of parameters included in the machine learning model;

modify the machine learning model to associate, based on identifying that the one or more parameters of the second subset of images are different from the set of parameters included in the machine learning model, the one or more parameters of the second subset of images with the first classification;

identify a set of actions associated with the first classification, wherein the set of actions include one or more vehicle control actions;

receive particular image data captured by a camera associated with a particular vehicle;

determine that that the particular image data is associated with the one or more parameters of the second subset of images;

determine, based on the modified machine learning model and based on determining that the particular image data is associated with the one or more parameters of the second subset of images, that the particular image data is associated with the first classification; and perform the set of actions, associated with the first classification, based on determining that the particular image data is associated with the first classification, wherein performing the set of actions includes outputting instructions to the particular vehicle to perform the one or more vehicle control actions of the set of actions associated with the first classification.

11. The non-transitory computer-readable medium of claim 10, wherein the plurality of processor-executable instructions further include instructions to:

train the machine learning model based on parameters of a set of labeled data and a plurality of classifications associated with each data item of the set of labeled data, wherein plurality of classifications comprises the first classification.

12. The non-transitory computer-readable medium of claim 10, wherein the plurality of processor-executable instructions further include processor-executable instructions to:

detect a particular object depicted in the particular set of image data captured by the camera associated with the particular vehicle based on determining that the particular image data is associated with the first classification, wherein the set of actions are associated with detection of the particular object.

13. The non-transitory computer-readable medium of claim 10, wherein the plurality of processor-executable instructions further include processor-executable instructions to:

compute an error rate of the machine learning model based on the first classification assigned to the set of image data and probabilities with which the machine learning model classifies the set of image data with the first classification; and select one or more parameters of the set of parameters to adjust based on the error rate.

14. A method, comprising:

receiving a set of image data that includes a plurality of images;

identifying a machine learning model that associates a set of parameters to a first classification;

comparing parameters of each image, of the plurality of images, to the set of parameters included in the machine learning model;

determining, based on the comparing, that a first subset of images, of the plurality of images, are associated with the first classification;

determining, based on the comparing, that a second subset of images, of the plurality of images, are associated with a second classification and are not associated with the first classification;

identifying one or more parameters of the second subset of images that are different from the set of parameters included in the machine learning model;

modifying the machine learning model to associate, based on identifying that the one or more parameters of the second subset of images are different from the set of parameters included in the machine learning model, the one or more parameters of the second subset of images with the first classification;

identifying a set of actions associated with the first classification, wherein the set of actions include one or more vehicle control actions;

receiving particular image data captured by a camera associated with a particular vehicle;

determining that that the particular image data is associated with the one or more parameters of the second subset of images;

determining, based on the modified machine learning model and based on determining that the particular image data is associated with the one or more parameters of the second subset of images, that the particular image data is associated with the first classification; and performing the set of actions, associated with the first classification, based on determining that the particular image data is associated with the first classification, wherein performing the set of actions includes outputting instructions to the particular vehicle to perform the one or more vehicle control actions of the set of actions associated with the first classification.

15. The method of claim 14 further comprising:

computing an error rate of the machine learning model based on the first classification assigned to the set of image data and probabilities with which the machine learning model classifies the set of image data with the first classification; and selecting one or more parameters of the set of parameters to adjust based on the error rate.

16. The method of claim 14 further comprising:

defining a pseudo-label for the plurality of images of the set of image data based on the first subset of images being classified by the machine learning model to the first classification, the second subset of the plurality of images being classified by the machine learning model to second classification, each image of the first subset of images being associated with a same particular domain, and the first subset of images having a greater quantity of images than the second subset of images.

17. The method of claim 16, wherein defining the pseudo-label comprises:

replacing a first label that is defined for the second classification and that is output by the machine learning model for the second subset of the first subset of images with a different second label that is defined for the pseudo-label and the first classification.

18. The method of claim 14 further comprising:

training the machine learning model using a first set of images that are labeled with the first classification, wherein the set of data comprises a different second set of images that are not labeled with a classification.

19. The method of claim 18 further comprising:

modifying the machine learning model by expanding a parameterized definition of a particular object represented by the first set of images to include the one or more parameters from a subset of the second set of images that correspond to the second subset of images.

20. The method of claim 14, further comprising:

detecting a particular object depicted in the particular set of image data captured by the camera associated with the particular vehicle based on determining that the particular image data is associated with the first classification, wherein the set of actions are associated with detection of the particular object.

* * * * *